US012548225B2

(12) United States Patent
Sun et al.

(10) Patent No.: US 12,548,225 B2
(45) Date of Patent: Feb. 10, 2026

(54) AUDIO OR VISUAL INPUT INTERACTING WITH VIDEO CREATION

(71) Applicant: Lemon Inc., Grand Cayman (KY)

(72) Inventors: Chenyu Sun, Los Angeles, CA (US); Maryyann Crichton, Culver City, CA (US); Xuye Cai, Beijing (CN); Tao Xiong, Beijing (CN); Jing Jie Chen, Los Angeles, CA (US); Carmen Worthge, Culver City, CA (US); Julia Meng, Culver City, CA (US); Michelle Catalanotto, Culver City, CA (US)

(73) Assignee: Lemon Inc., Grand Cayman (KY)

( * ) Notice: Subject to any disclaimer, the term of this patent is extended or adjusted under 35 U.S.C. 154(b) by 126 days.

(21) Appl. No.: 17/843,891

(22) Filed: Jun. 17, 2022

(65) Prior Publication Data

US 2023/0410396 A1    Dec. 21, 2023

(51) Int. Cl.
*G06T 13/20*   (2011.01)
*G06T 13/80*   (2011.01)
*H04N 5/262*   (2006.01)

(52) U.S. Cl.
CPC ............ *G06T 13/205* (2013.01); *G06T 13/80* (2013.01); *H04N 5/2621* (2013.01)

(58) Field of Classification Search
CPC ....... G06T 13/205; G06T 13/80; G06T 11/00; G06T 13/40; H04N 5/2621; G10L 21/013;

(Continued)

(56) References Cited

U.S. PATENT DOCUMENTS 6,490,359 B1 *  12/2002  Gibson ................. H04H 60/04
                                                  381/119
6,539,354 B1 *   3/2003  Sutton ..................... G10L 13/00
                                                  704/E21.02

(Continued)

FOREIGN PATENT DOCUMENTS

CN       106648083 A      5/2017
CN       109495767 A      3/2019

(Continued)

OTHER PUBLICATIONS

P. Arias, C. Soladié, O. Bouafif, A. Roebel, R. Séguier and J.-J. Aucouturier, "Realistic Transformation of Facial and Vocal Smiles in Real-Time Audiovisual Streams," in IEEE Transactions on Affective Computing, vol. 11, No. 3, pp. 507-518, Jul. 1-Sep. 2020, doi: 10.1109/TAFFC.2018.2811465. (Year: 2020).*

(Continued)

*Primary Examiner* — Charles L Beard
(74) *Attorney, Agent, or Firm* — BakerHostetler

(57) ABSTRACT

A first type of input may be received via a first component of a computing device during creation of a video item. The first type of input may correspond to a first type of element associated with the video item. Characteristics of signals in the first type of input may be determined, in real time, based on the first type of input. At least one modification may be caused to a second type of element associated with the video item based at least in part on the characteristics of the signals in the first type of input. In some examples, the first type of input may be audio input, and the second type of element may comprise a visual element. In other examples, the first type of input may be video input, and the second type of element may comprise an audio element.

20 Claims, 17 Drawing Sheets

(58) Field of Classification Search
CPC . G10L 25/57; G10L 25/90; G10L 2021/0135; G10L 21/10; G10H 1/368; G10H 2210/066

See application file for complete search history.

(56) References Cited

U.S. PATENT DOCUMENTS

| | | | | |
|---|---|---|---|---|
| 6,714,660 | B1* | 3/2004 | Ohba | G06V 40/168 |
| | | | | 375/E7.076 |
| 6,919,892 | B1* | 7/2005 | Cheiky | G06T 13/40 |
| | | | | 348/E5.022 |
| 7,027,054 | B1* | 4/2006 | Cheiky | H04N 5/262 |
| | | | | 345/473 |
| 7,389,002 | B1* | 6/2008 | Knight | G06V 10/245 |
| | | | | 345/698 |
| 7,728,866 | B2* | 6/2010 | Currivan | H04N 7/147 |
| | | | | 348/14.02 |
| 8,017,851 | B2* | 9/2011 | Horovitz | A63F 13/45 |
| | | | | 84/611 |
| 8,766,983 | B2* | 7/2014 | Marks | A63F 13/79 |
| | | | | 345/473 |
| 9,094,576 | B1* | 7/2015 | Karakotsios | G10L 15/02 |
| 9,104,908 | B1* | 8/2015 | Rogers | G06V 40/176 |
| 9,111,134 | B1* | 8/2015 | Rogers | G06V 10/7557 |
| 9,314,692 | B2* | 4/2016 | Konoplev | A63F 13/10 |
| 10,013,736 | B1* | 7/2018 | Lee | G06T 3/00 |
| 10,264,214 | B1* | 4/2019 | Kumar | H04M 3/28 |
| 10,360,716 | B1* | 7/2019 | van der Meulen | G10L 25/57 |
| 10,445,936 | B1* | 10/2019 | Charlton | G06T 19/20 |
| 10,586,369 | B1* | 3/2020 | Roche | G10L 13/00 |
| 10,599,289 | B1* | 3/2020 | Voss | G06F 3/0488 |
| 10,755,463 | B1* | 8/2020 | Albuz | G10L 13/00 |
| 10,878,635 | B1* | 12/2020 | Charlton | G06T 19/006 |
| 10,896,535 | B2* | 1/2021 | Li | G06N 3/094 |
| 11,113,859 | B1* | 9/2021 | Xiao | G06T 15/005 |
| 11,228,622 | B2* | 1/2022 | Copley | H04N 7/147 |
| 11,257,293 | B2* | 2/2022 | Zhang | G06T 11/00 |
| 11,521,341 | B1* | 12/2022 | Li | G11B 27/031 |
| 11,532,179 | B1* | 12/2022 | Anooj | G06V 40/174 |
| 11,553,159 | B1* | 1/2023 | Rothschild | H04N 7/152 |
| 11,756,251 | B2* | 9/2023 | Kaushik | G10L 25/63 |
| | | | | 345/473 |
| 11,756,527 | B1* | 9/2023 | Richter | G10L 13/00 |
| | | | | 345/633 |
| 11,763,496 | B2* | 9/2023 | Xu | A63F 13/213 |
| | | | | 345/633 |
| 11,830,119 | B1* | 11/2023 | Siy | G06T 13/00 |
| 11,893,221 | B2* | 2/2024 | Lin | G06F 3/04847 |
| 12,125,130 | B1* | 10/2024 | Mulliken | H04N 7/157 |
| 2002/0018067 | A1* | 2/2002 | Carcia | G06T 13/205 |
| | | | | 345/473 |
| 2003/0040916 | A1* | 2/2003 | Major | G10L 21/06 |
| | | | | 704/E21.02 |
| 2005/0021625 | A1* | 1/2005 | Fujimura | H04N 7/15 |
| | | | | 348/E7.083 |
| 2005/0273331 | A1* | 12/2005 | Lu | G06V 40/171 |
| | | | | 704/E21.02 |
| 2007/0156408 | A1* | 7/2007 | Saito | G10L 13/08 |
| | | | | 704/E13.011 |
| 2007/0242066 | A1* | 10/2007 | Levy Rosenthal | H04N 5/272 |
| | | | | 345/419 |
| 2010/0067798 | A1* | 3/2010 | Hung | G06T 13/205 |
| | | | | 375/240.26 |
| 2010/0085363 | A1* | 4/2010 | Smith | H04N 5/262 |
| | | | | 345/473 |
| 2010/0153847 | A1* | 6/2010 | Fama | H04N 9/8244 |
| | | | | 386/278 |
| 2010/0235166 | A1* | 9/2010 | Bardino | G10L 13/10 |
| | | | | 704/207 |
| 2011/0016395 | A1* | 1/2011 | Margulis | G11B 27/34 |
| | | | | 715/716 |
| 2011/0064388 | A1* | 3/2011 | Brown | H04N 21/816 |
| | | | | 704/E13.011 |
| 2011/0216158 | A1* | 9/2011 | Bigioi | H04N 23/698 |
| | | | | 382/103 |
| 2011/0227931 | A1* | 9/2011 | Lu | G06T 13/205 |
| | | | | 345/473 |
| 2012/0033132 | A1* | 2/2012 | Chen | G11B 27/28 |
| | | | | 348/E7.001 |
| 2012/0069028 | A1* | 3/2012 | Bouguerra | H04L 51/046 |
| | | | | 715/810 |
| 2012/0210232 | A1* | 8/2012 | Wang | H04N 19/117 |
| | | | | 715/723 |
| 2012/0276504 | A1* | 11/2012 | Chen | G09B 19/06 |
| | | | | 434/157 |
| 2012/0307096 | A1* | 12/2012 | Ford | H04N 23/611 |
| | | | | 348/222.1 |
| 2013/0083155 | A1* | 4/2013 | Andresen | H04L 51/043 |
| | | | | 348/E7.083 |
| 2013/0195428 | A1* | 8/2013 | Marks | G11B 27/10 |
| | | | | 386/278 |
| 2013/0236102 | A1* | 9/2013 | Hung | G06V 40/168 |
| | | | | 382/190 |
| 2014/0195222 | A1* | 7/2014 | Peevers | G10L 21/00 |
| | | | | 704/201 |
| 2014/0222995 | A1* | 8/2014 | Razden | G09B 7/02 |
| | | | | 709/224 |
| 2014/0267117 | A1* | 9/2014 | Moll | G09G 5/377 |
| | | | | 345/173 |
| 2015/0206310 | A1* | 7/2015 | Okada | G06T 11/00 |
| | | | | 348/222.1 |
| 2015/0302551 | A1* | 10/2015 | Huang | G06T 3/40 |
| | | | | 382/199 |
| 2015/0312523 | A1* | 10/2015 | Li | G06F 3/0488 |
| | | | | 348/14.03 |
| 2015/0379752 | A1* | 12/2015 | Li | G06T 13/80 |
| | | | | 715/752 |
| 2016/0027198 | A1* | 1/2016 | Terry | G06F 40/40 |
| | | | | 345/473 |
| 2016/0343168 | A1* | 11/2016 | Mullins | G06T 19/006 |
| 2017/0004646 | A1* | 1/2017 | Phillipps | G06T 13/80 |
| 2017/0206697 | A1* | 7/2017 | McKenzie | G06T 13/205 |
| 2017/0310927 | A1* | 10/2017 | West | G06T 13/80 |
| 2018/0144775 | A1* | 5/2018 | Taine | H04N 7/155 |
| 2018/0160055 | A1* | 6/2018 | Taine | G06V 40/174 |
| 2018/0184171 | A1* | 6/2018 | Danker | H04N 5/272 |
| 2018/0198990 | A1* | 7/2018 | Greenberger | H04N 5/2621 |
| 2018/0336713 | A1* | 11/2018 | Avendano | G06T 13/40 |
| 2018/0336714 | A1* | 11/2018 | Stoyles | G06V 40/174 |
| 2018/0336716 | A1* | 11/2018 | Ramprashad | G06F 3/012 |
| 2018/0357802 | A1* | 12/2018 | Messmer | G09G 5/377 |
| 2019/0130628 | A1* | 5/2019 | Cao | G06T 13/205 |
| 2019/0147838 | A1* | 5/2019 | Serletic, II | G10L 13/027 |
| | | | | 704/260 |
| 2019/0197755 | A1* | 6/2019 | Vats | G06T 13/40 |
| 2019/0260702 | A1* | 8/2019 | Hall | H04L 67/75 |
| 2020/0058151 | A1* | 2/2020 | Stukalov | G06T 13/00 |
| 2020/0098114 | A1* | 3/2020 | Kudriashov | G06T 7/136 |
| 2020/0120400 | A1* | 4/2020 | Palmer | G06V 40/28 |
| 2020/0175736 | A1* | 6/2020 | Jia | G06F 3/04845 |
| 2020/0186747 | A1* | 6/2020 | Monastyrshyn | G06F 3/04883 |
| 2020/0234483 | A1* | 7/2020 | Mashrabov | H04L 51/10 |
| 2020/0234508 | A1* | 7/2020 | Shaburov | G06V 40/171 |
| 2020/0358983 | A1* | 11/2020 | Astarabadi | H04N 7/157 |
| 2020/0380031 | A1* | 12/2020 | Zhou | G06T 19/006 |
| 2021/0027511 | A1* | 1/2021 | Shang | G06N 3/084 |
| 2021/0043110 | A1* | 2/2021 | Jung | G10L 15/24 |
| 2021/0065454 | A1* | 3/2021 | Goodrich | G06N 20/00 |
| 2021/0074069 | A1* | 3/2021 | Charlton | G06F 3/165 |
| 2021/0097742 | A1* | 4/2021 | Krishnan Gorumkonda | |
| | | | | G06T 13/80 |
| 2021/0134177 | A1* | 5/2021 | Ridgway | G06T 13/205 |
| 2021/0233299 | A1* | 7/2021 | Zhou | G06T 13/205 |
| 2021/0248801 | A1* | 8/2021 | Li | G06T 13/205 |
| 2021/0258511 | A1* | 8/2021 | Goodrich | H04L 51/10 |
| 2021/0406305 | A1* | 12/2021 | Shen | G11B 27/031 |
| 2021/0407527 | A1* | 12/2021 | Deole | G06Q 30/016 |
| 2022/0068001 | A1* | 3/2022 | Kaushik | G06T 13/205 |
| 2022/0068010 | A1* | 3/2022 | Cambra | G06T 19/006 |
| 2022/0078370 | A1* | 3/2022 | Monastyrshyn | H04N 5/77 |

(56) References Cited

U.S. PATENT DOCUMENTS

| | | | |
|---|---|---|---|
| 2022/0108510 A1* | 4/2022 | Sagar | G10L 21/10 |
| 2022/0122573 A1* | 4/2022 | Steinwedel | G10H 1/368 |
| 2022/0126201 A1* | 4/2022 | Ma | H04L 65/1059 |
| 2022/0132217 A1* | 4/2022 | Aher | G06V 20/41 |
| 2022/0148246 A1* | 5/2022 | Krishnan Gorumkonda | G06T 13/40 |
| 2022/0270505 A1* | 8/2022 | Carmichael | G09B 7/02 |
| 2022/0309724 A1* | 9/2022 | Richard | G06T 13/205 |
| 2022/0337780 A1* | 10/2022 | Huang | G06F 3/011 |
| 2022/0351424 A1* | 11/2022 | Kasper | G06T 13/40 |
| 2022/0392131 A1* | 12/2022 | Li | G10L 21/10 |
| 2022/0405982 A1* | 12/2022 | Lin | G06T 7/70 |
| 2022/0406001 A1* | 12/2022 | Li | G10L 25/03 |
| 2022/0406337 A1* | 12/2022 | Li | H04N 21/4394 |
| 2023/0035306 A1* | 2/2023 | Liu | H04N 19/597 |
| 2023/0051409 A1* | 2/2023 | Du | H04N 7/157 |
| 2023/0066179 A1* | 3/2023 | Berger | G06V 20/20 |
| 2023/0076959 A1* | 3/2023 | White | H04N 21/43 |
| 2023/0078483 A1* | 3/2023 | Berger | G06T 7/11 345/589 |
| 2023/0132415 A1* | 5/2023 | Dave | H04L 12/1822 348/14.08 |
| 2023/0136013 A1* | 5/2023 | Goodrich | G06T 13/40 345/419 |
| 2023/0162408 A1* | 5/2023 | Schager | G06T 7/12 345/581 |
| 2023/0164298 A1* | 5/2023 | Khot | H04N 7/15 348/14.08 |
| 2023/0222721 A1* | 7/2023 | Chen | G06T 13/40 345/419 |
| 2023/0306666 A1* | 9/2023 | Mitchell | G06T 13/205 |
| 2023/0306700 A1* | 9/2023 | Guo | G06T 13/205 |
| 2023/0316643 A1* | 10/2023 | Chai | G06V 40/193 345/419 |
| 2023/0317246 A1* | 10/2023 | Dhillon | A61B 5/4803 705/2 |
| 2023/0343010 A1* | 10/2023 | Kwatra | G06T 13/40 |
| 2023/0351662 A1* | 11/2023 | Sinha | G10L 25/63 |
| 2023/0351998 A1* | 11/2023 | Savchenkov | G06V 10/764 |
| 2023/0393659 A1* | 12/2023 | Walton | G06T 11/00 |
| 2024/0005364 A1* | 1/2024 | Ryu | G06F 3/04817 |
| 2024/0013462 A1* | 1/2024 | Seol | G06T 13/40 |
| 2024/0013802 A1* | 1/2024 | Federov | G10L 25/30 |
| 2024/0070955 A1* | 2/2024 | Li | G06V 40/174 |
| 2024/0212252 A1* | 6/2024 | Wu | G06V 20/46 |
| 2024/0264795 A1* | 8/2024 | Allinson | H04R 5/02 |
| 2024/0331445 A1* | 10/2024 | Sekar | G06V 10/7715 |
| 2024/0412438 A1* | 12/2024 | Fan | G06T 17/20 |
| 2025/0078380 A1* | 3/2025 | Cao | H04N 21/2187 |

FOREIGN PATENT DOCUMENTS

| | | |
|---|---|---|
| CN | 114079817 A | 2/2022 |
| CN | 114390341 A | 4/2022 |
| JP | 2003-125361 A | 4/2003 |
| JP | 2005-346721 A | 12/2005 |
| JP | 2020-523810 A | 8/2020 |

OTHER PUBLICATIONS

International Patent Application No. PCT/SG2023/050386; Int'l Search Report; dated Jan. 19, 2024; 4 pages.

Japan Patent Application No. 2024-573292; Notice of Reasons for Refusal; dated Dec. 16, 2025; 8 pages.

* cited by examiner

300 

310 Receive a first type of input via a first component of a computing device during creation of a video item, wherein the first type of input corresponds to a first type of element associated with the video item

312 Determine, based on the first type of input, characteristics of signals in the first type of input in real time

314 Cause at least one modification to a second type of element associated with the video item based at least in part on the characteristics of the signals in the first type of input

710 Receive audio input via a microphone during creation of a video item, wherein the audio input corresponds to a voice element associated with the video item 712 Determine, based on the audio input, characteristics of signals in the audio input in real time 714 Insert at least one animated graphical element into the video item based on changing of at least one of the characteristics of the signals within the audio input

1010 Receive video input via a camera during creation of a video item, wherein the video input corresponds to a visual element associated with the video item

1012 Determine, based on the video input, characteristics of signals in the video input in real time, wherein the characteristics comprise a movement of at least one body part within the video input

1014 Modify a sound feature in the audio output based on the movement of the at least one body part within the video input, wherein the sound feature comprises at least one of pitch, tone, volume, energy, or duration

FIG. 10

AUDIO OR VISUAL INPUT INTERACTING WITH VIDEO CREATION

BACKGROUND

Communication is increasingly being conducted using Internet-based tools. The Internet-based tools may be any software or platform. Existing social media platforms enable users to communicate with each other by sharing images, videos, and other information via static app or web pages. As communication devices, such as mobile phones, become more sophisticated, people continue to desire new ways for entertainment, social networking, and communication.

BRIEF DESCRIPTION OF THE DRAWINGS

The following detailed description may be better understood when read in conjunction with the appended drawings. For the purposes of illustration, there are shown in the drawings example embodiments of various aspects of the disclosure; however, the invention is not limited to the specific methods and instrumentalities disclosed.

FIG. 3 shows an example method for video creation input-based element modification which may be in accordance with the present disclosure.

FIG. 7 shows another example method for audio input-based visual element modification which may be in accordance with the present disclosure.

FIG. 10 shows another example method for video input-based audio element modification which may be in accordance with the present disclosure.

DETAILED DESCRIPTION OF ILLUSTRATIVE EMBODIMENTS

Users may employ a content creation platform to generate content, such as video items. In some examples, a video item may be created based on video input, such as may be captured via a camera. The video input may sometimes include video of a user, for example including the user's face. Additionally, the video item may have corresponding audio output. The audio output may be generated based on audio input, such as may be captured via a microphone. The audio input may sometimes include audio of a user, for example including the user's voice. Users may wish to add effects to a video item, such as one or more visual effects. Users may also wish to add audio effects to the output audio that accompanies the video item.

One drawback of existing video creation platforms is that techniques for controlling audio and visual effects may be limited. For example, users may have limited input techniques for indicating when a visual or audio effect is to be applied to a video item or to output audio. Techniques may also be limited for selecting types of visual and audio effects and for controlling the magnitude and duration of the of the visual and audio effects. Some existing input techniques for visual and audio effects may be inconvenient and may require the user to perform additional actions or steps that would otherwise not be required to create a video. This may potentially result in confusion to users, delay the video creation process, dissuade users from employing desired effects, and otherwise degrade the user experience for both content creators and content viewers.

Described herein are techniques for video creation input-based audio and visual effects. In some examples, the described techniques may allow a user to create and control visual effects based on audio input, optionally in real time. In one example, changes in audio input from a microphone, such as changes in a user's voice, may be used to control one or more visual effects in the video item. These changes may be included in characteristics of sound features, such as pitch, tone, volume, energy or duration. The visual effects may include, for example, stretching or shaking a visual element, inserting an animated graphical element into the video item, moving a visual element, and the like. Additionally, in some examples, the described techniques may allow a user to create and control audio effects based on video input, optionally in real time. In one example, changes in video input from a camera, such as movement of one or more body parts, may be used to control one or more audio effects in the audio output. The audio effects may include, for example, modifying a sound feature in the audio output, such as pitch, tone, volume, energy, echo, duration, and the like.

Figure 1:
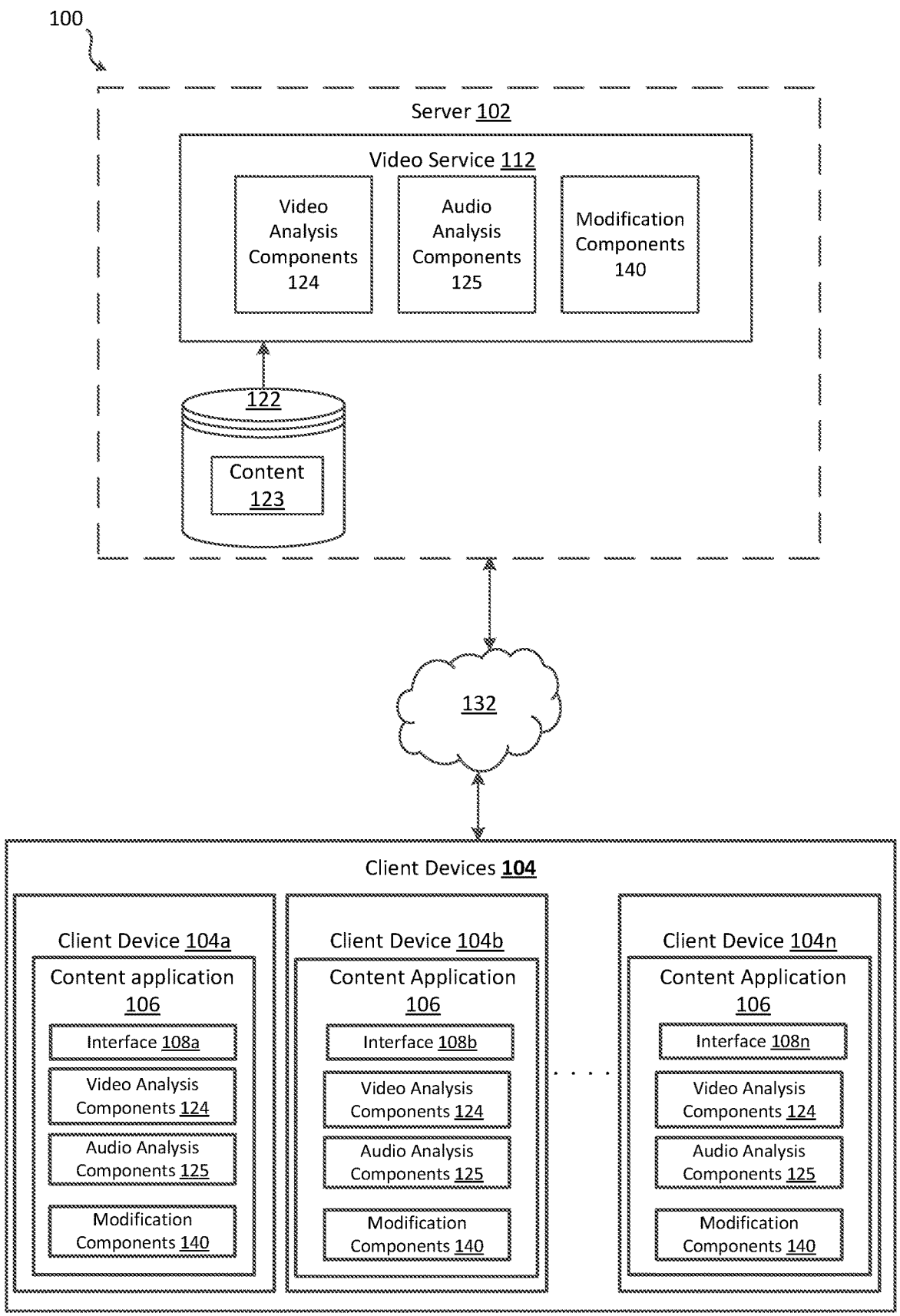
FIG. 1 shows an example system for distributing content which may be in accordance with the present disclosure.

The techniques for video creation input-based audio and visual effects described herein may be utilized by a system for distributing content. FIG. 1 illustrates an example system 100 for distributing content. The system 100 may comprise a server 102 and a plurality of client devices 104. The server 102 and the plurality of client devices 104a-n may communicate with each other via one or more networks 132.

The server 102 may be located at a data center, such as a single premise, or be distributed throughout different geographic locations (e.g., at several premises). The server 102 may provide the services via the one or more networks 132. The one or more networks 132 may comprise a variety of network devices, such as routers, switches, multiplexers, hubs, modems, bridges, repeaters, firewalls, proxy devices, and/or the like. The one or more networks 132 may comprise physical links, such as coaxial cable links, twisted pair cable links, fiber optic links, a combination thereof, and/or the like. The one or more networks 132 may comprise wireless links, such as cellular links, satellite links, Wi-Fi links and/or the like.

The server 102 may comprise a plurality of computing nodes that host a variety of services. In an embodiment, the nodes host a video service 112. The video service 112 may comprise a content streaming service, such as an Internet protocol video streaming service. The video service 112 may be configured to distribute content 123 via a variety of transmission techniques. The video service 112 is configured to provide the content 123, such as video, audio, textual data, a combination thereof, and/or the like. The content 123 may comprise content streams (e.g., video stream, audio stream, information stream), content files (e.g., video file, audio file, text file), and/or other data. The content 123 may be stored in a database 122. For example, the video service 112 may comprise a video sharing service, a video hosting platform, a content distribution platform, a collaborative gaming platform, and/or the like.

In an embodiment, the content 123 distributed or provided by the video service 112 comprises videos. The videos may have a duration less than or equal to a predetermined time limit, such as one minute, five minutes, or other predetermined minutes. By way of example and without limitation, the videos may comprise at least one, but no more than four, fifteen second segments strung together. The short duration of the videos may provide viewers with quick bursts of entertainment that allow users to watch a large quantity of videos in a short time frame. Such quick bursts of entertainment may be popular on social media platforms.

The videos may comprise a pre-recorded audio overlay, such as a clip of a pre-recorded song or audio from a television show or movie. If a short video comprises a pre-recorded audio overlay, the short video may feature one or more individuals lip-syncing, dancing, or otherwise moving their body along with the pre-recorded audio. For example, a short video may feature an individual completing a "dance challenge" to a popular song or a short video may feature two individuals participating in a lip-syncing or dancing duet. As another example, a short video may feature an individual completing a challenge that requires them to move his or her body in a manner that corresponds to the pre-recorded audio overlay, such as in a manner that corresponds to the beat or rhythm of the pre-recorded song featured by the pre-recorded audio overlay. Other videos may not comprise a pre-recorded audio overlay. For example, these videos may feature an individual playing sports, pulling pranks, or giving advice, such as beauty and fashion advice, cooking tips, or home renovation tips.

In an embodiment, the content 123 may be output to different client devices 104 via the network 132. The content 123 may be streamed to the client devices 104. The content stream may be a stream of videos received from the video service 112. The plurality of client devices 104 may be configured to access the content 123 from the video service 112. In an embodiment, a client device 104 may comprise a content application 106. The content application 106 outputs (e.g., displays, renders, presents) the content 123 to a user associated with the client device 104. The content may comprise videos, audio, comments, textual data and/or the like.

The plurality of client devices 104 may comprise any type of computing device, such as a mobile device, a tablet device, laptop, a desktop computer, a smart television or other smart device (e.g., smart watch, smart speaker, smart glasses, smart helmet), a gaming device, a set top box, digital streaming device, robot, and/or the like. The plurality of client devices 104 may be associated with one or more users. A single user may use one or more of the plurality of client devices 104 to access the server 102. The plurality of client devices 104 may travel to a variety of locations and use different networks to access the server 102.

The video service 112 may be configured to receive input from users. The users may be registered as users of the video service 112 and may be users of the content application 106 operating on client devices 104. The user inputs may include videos created by users, user comments associated with videos, or "likes" associated with videos. The user inputs may include connection requests and user input data, such as text data, digital image data, or user content. The connection requests may comprise requests from the client devices 104a-d to connect to the video service 112. The user input data may include information, such as videos and/or user comments, that the users connected to the video service 112 want to share with other connected users of the video service 112.

The video service 112 may be able to receive different types of input from users using different types of client devices 104. For example, a user using the content application 106 on a first user device, such as a mobile phone or tablet, may be able to create and upload videos using the content application 106. A user using the content application 106 on a different mobile phone or tablet may also be able to view, comment on, or "like" videos or comments written by other users. In another example, a user using the content application 106 on a smart television, laptop, desktop, or gaming device may not be able to create and upload videos or comment on videos using the content application 106. Instead, the user using the content application 106 on a smart television, laptop, desktop, or gaming device may only be able to use the content application 106 to view videos, view comments left by other users, and "like" videos.

In an embodiment, a user may use the content application 106 on a client device 104 to create a video, such as a short video, and upload the video to the server 102. The client devices 104 may access an interface 108 of the content application 106. The interface 108 may comprise an input element. For example, the input element may be configured to allow users to create the video. To create the short video, the user may give the content application 106 permission to access an image capture device, such as a camera, or a microphone of the client device 104. Using the content application 106, the user may select a duration for the video or set a speed for the video, such as "slow-motion" or "speed things up."

The user may edit the video using the content application 106. After the user has created the video, the user may use the content application 106 to upload the video to the server 102 and/or to save the video locally to a client device 104a-n. When a user uploads the video to the server 102, they may choose whether they want the video to be viewable by all other users of the content application 106 or viewable by only a subset of the users of the content application 106. The video service 112 may store the uploaded videos and any metadata associated with the videos in one or more databases 122.

In an embodiment, a user may use the content application 106 on a client device 104 to provide input on a video. The client devices 104 may access an interface 108 of the content application 106 that allows users to provide input associated with videos. The interface 108 may comprise an input element. For example, the input element may be configured to receive input from a user, such as comments or "likes" associated with a particular video. If the input is a comment, the content application 106 may allow a user to set an emoji associated with his or her input. The content application 106 may determine timing information for the input, such as when a user wrote a comment. The content application 106 may send the input and associated metadata to the server 102. For example, the content application 106 may send a comment, an identifier of the user that wrote the comment, and the timing information for the comment to the server 102. The video service 112 may store the input and associated metadata in a database 122.

The video service 112 may be configured to output the uploaded videos and user input to other users. The users may be registered as users of the video service 112 to view videos created by other users. The users may be users of the content application 106 operating on client devices 104. The content application 106 may output (display, render, present) the videos and user comments to a user associated with a client device 104. The client devices 104 may access an interface 108 of the content application 106. The interface 108 may comprise an output element. The output element may be configured to display information about different videos so that a user can select a video to view. For example, the output element may be configured to display a plurality of cover images, captions, or hashtags associated with the videos. The output element may also be configured to arrange the videos according to a category associated with each video.

In an embodiment, the user comments associated with a video may be output to other users watching the same video. For example, all users accessing a video may view comments associated with the video. The video service 112 may output the video and the associated comments simultaneously. Comments may be output by the video service 112 in real time or near-real time. The content application 106 may display the videos and comments in various ways on the client device 104. For example, the comments may be displayed in an overlay above the content or in an overlay beside the content. As another example, a user that wants to view other users' comments associated with a video may need to select a button in order to view the comments. The comments may be animated when displayed. For example, the comments may be shown scrolling across the video or across the overlay.

Figure 2:
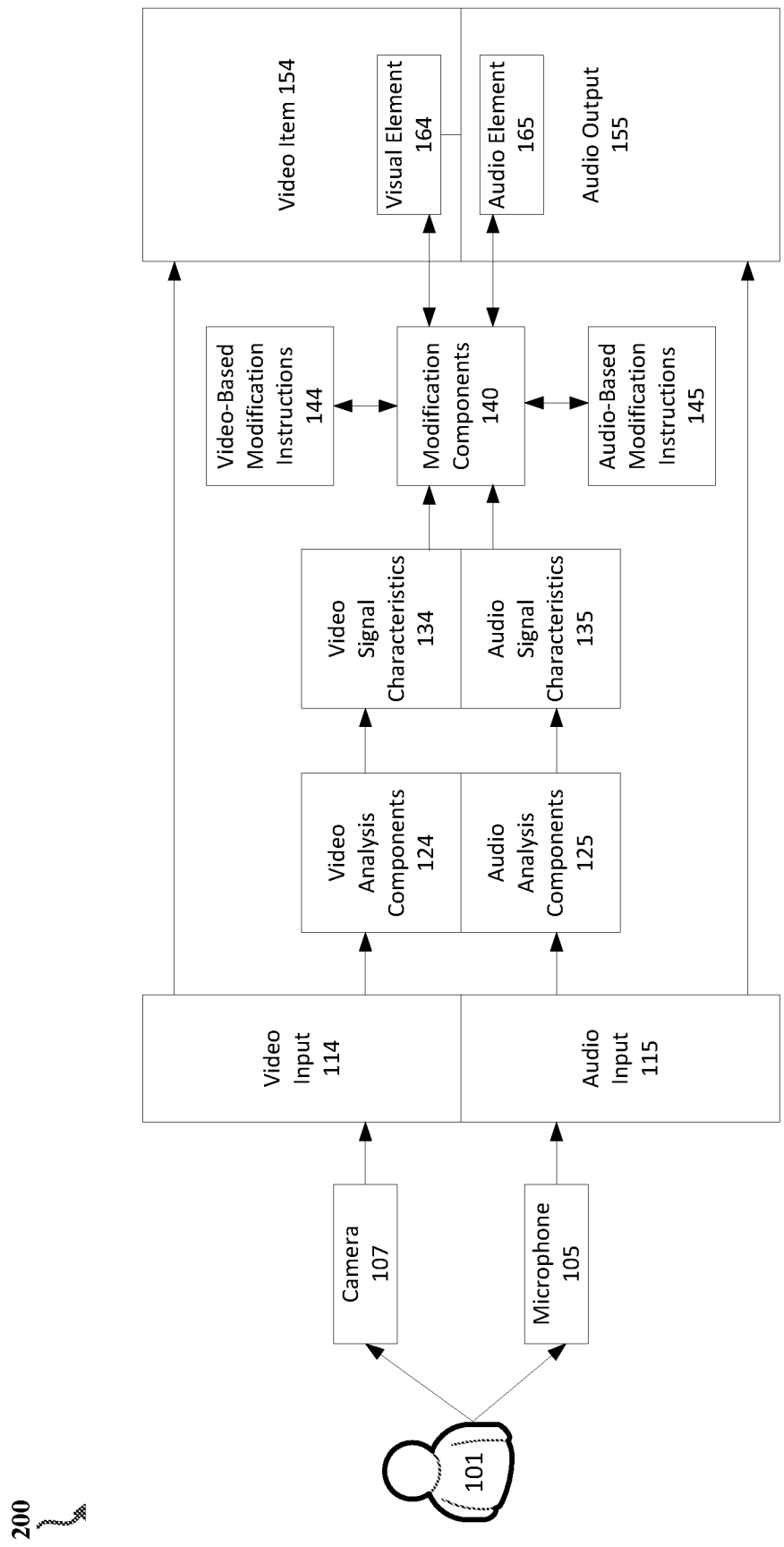
FIG. 2 shows an example diagram depicting audio and visual element modification which may be in accordance with the present disclosure.

According to the techniques described herein, characteristics of input signals, such as signals in input video and input audio, may be used to control a modification of an element associated with a video item, such as a visual or audio element. FIG. 2 shows an example diagram depicting audio and visual element modification which may be in accordance with the present disclosure. As shown in FIG. 2, system 200 generates a video item 154 based on video input 114. The video input 114 may be captured by a camera 107, such as may be included within one or more of client devices 104a-n of FIG. 1. In the example of FIG. 2, the video input 114 includes video of user 101, such as video that includes the user's face and/or other body parts of the user 101. The video item 154 may include at least some, and in some cases all, of the contents of video input 114, although the contents of video input 114 may be modified in one or more ways upon being included in video item 154.

The video item 154 has corresponding audio output 155. The audio output 155 may be generated based on audio input 115. The audio input 115 may be captured by a microphone 105, such as may be included within one or more of client devices 104a-n of FIG. 1. In the example of FIG. 2, the audio input 115 includes audio of user 101, such as audio that includes the voice of the user 101. The audio output 155 may include at least some, and in some cases all, of the contents of audio input 115, although the contents of audio input 115 may be modified in one or more ways upon being included in audio output 155. During playback, the video item 154 and the audio output 155 may be played together in synchronization with one another. For example, the audio output 155 may include words spoken by the user 101, and the words may be played in the audio output 155 in synchronization with the display of corresponding mouth movements of the user 101 in the video item 154.

As shown in FIG. 2, audio analysis components 125 may perform an audio analysis on the audio input 115 to determine audio signal characteristics 135. The audio analysis may be performed during creation of the video item 154. The audio signal characteristics 135 may change over time in the audio input 115. For example, the audio signal characteristics 135 may include sound features, such as pitch, tone, volume, energy, and/or duration. In some examples, the audio signal characteristics 135 may include sound features, such as pitch, tone, volume, energy, and/or duration of the voice of user 101, including sounds made by the user 101. In some cases, the audio analysis components 125 may employ one or more machine learning models, such as one or more neural network models, to perform the audio analysis on the audio input 115. In some examples, the audio analysis may include converting the audio input 115 into the frequency domain, such as by executing one or more frequency domain transforms (e.g., a Fourier transform or another similar transform) on the audio input 115. In some examples, the audio analysis may include determining audio signal characteristics 135, such as such as pitch, tone, volume and energy, at different times—as well as determining and tracking changes in those characteristics over time.

Upon being determined by audio analysis components 125, the audio signal characteristics 135 may be provided to modification components 140. The modification components 140 may then evaluate the audio signal characteristics 135 in combination with audio-based modification instructions 145 to determine one or more modifications to make to the video item 154. For example, the audio-based modification instructions 145 may indicate various conditions for modifying a visual element 164 within the video item 154. Specifically, the audio-based modification instructions 145 may indicate changes in the audio signal characteristics 135 that may trigger a modification to visual element 164. For example, these triggering conditions may include a change in pitch, tone, or volume of the user's voice or another sound, such as a background sound. In some cases, the triggering condition may require the pitch, tone or volume to meet selected criteria for at least at threshold time duration. The selected criteria may include, for example, exceeding a minimum threshold value, falling below a maximum threshold value, remaining within a given range of values, matching or correlating to a given pattern, and the like.

In addition to specifying a triggering condition, the audio-based modification instructions 145 may also specify a modification that results from the triggering condition. In some examples, the modification may include causing the visual element 164 to stretch, shake, change color and/or move. Also, in some examples, the modification may include inserting an animated graphical element into the video item 154 that replaces, obscures, or otherwise modifies the visual element 164. In some examples, the visual element 164 may include body parts of the user 101, such as the user's eyes, eyebrows, mouth, lips, nose, hands, arms, and the like. In other examples, the visual element 164 may be a different kind of object, such as a controllable character inside of a game-related video. Also, in some examples, the visual element 164 may include all, or any part of, an image frame within the video item.

In one specific example, the visual element 164 may stretch in one or more directions and/or shake based on a pitch of the voice of user 101, such as when the pitch is increased above certain levels. In another specific example, increasing an intensity (e.g., volume, energy, etc.) of the user's voice may cause animated graphical elements, such as fireballs, to be inserted over the visual element 164, such as the user's eyeballs, for example to convey a sense of anger or rage. Additionally, the user's voice may gradually assume a more metallic quality as the intensity of the user's voice is increased. In yet another specific example, changes in the pitch of the user's voice may control movement of the visual element 164. For example, the visual element 164 may be a character in a game. The character may move upwards as a pitch of the user's voice increases, and the character may move downwards as a pitch of the user's voice decreases. Any or all of these modifications to visual element 164 may be performed in real time upon detection of the audio signal characteristics 135 that trigger the modifications.

As also shown in FIG. 2, video analysis components 124 may perform a video analysis on the video input 114 to determine video signal characteristics 134. The video analysis may be performed during creation of the video item 154. The video signal characteristics 134 may change over time in the video input 114. For example, the video signal characteristics 134 may include locations and movements of different objects in the video input 114. In some examples, the video signal characteristics 134 may include locations and movement of at least one body part of the user 101, such as eyes, eyebrows, mouth, head, hands, and the like. In some cases, the video analysis components 124 may employ one or more machine learning models, such as one or more neural network models, to perform the video analysis on the video input 114. In some examples, the video analysis may include performing an object detection and/or object recognition analysis on different frames of the video input. The object detection and/or object recognition analysis may include a facial detection and/or facial recognition analysis. In some examples, the video analysis may include determining video signal characteristics 134, such as object locations, at different times—as well as determining and tracking changes in those locations over time.

Upon being determined by video analysis components 124, the video signal characteristics 134 may be provided to modification components 140. The modification components 140 may then evaluate the video signal characteristics 134 in combination with video-based modification instructions 144 to determine one or more modifications to make to the audio output 155. For example, the video-based modification instructions 144 may indicate various conditions for modifying an audio element 165 within the audio output 155. Specifically, the video-based modification instructions 144 may indicate changes in the video signal characteristics 134 that may trigger a modification to audio element 165. For example, these triggering conditions may include a movement of an object, such as a body part of the user 101, for example the user's eyes, eyebrows, mouth, lips, nose, hands, arms, and the like. In some cases, the triggering condition may require the object to move in one or more selected directions, to exceed a given movement speed threshold and/or movement distance threshold, to follow a selected movement pattern, and the like.

In addition to specifying a triggering condition, the video-based modification instructions 144 may also specify a modification that results from the triggering condition. In some examples, the modification may include causing the audio element 165 to change. In some examples, the audio element 165 may include a feature of a voice of the user 101, such as pitch, tone, volume, energy, echo, or duration. In one specific example, the user 101 may move his or her eyebrows to cause to cause a pitch of the user's voice to change. For example, the eyebrows may be moved up to raise the pitch of the user's voice, and the eyebrows may be moved down to lower the pitch of the user's voice. In another specific example, movement of a body part or other object may cause an echoing effect. For example, a body part may be raised upwards to increase an echoing effect, such as to transform the user's voice in real time to achieve an angelic sounding echo. The body part may also be lowered to decrease the echoing effect. Any or all of these modifications to audio element 165 may be performed in real time upon detection of the video signal characteristics 134 that trigger the modifications.

In some examples, any, or all, of the above-described video analysis techniques, audio analysis techniques, visual element modification techniques, and audio element modification techniques may be performed by one or more of client devices 104*a-n* and/or server 102 of FIG. 1. Referring back to FIG. 1, an example is shown in which the video analysis components 124, the audio analysis components 125, and the modification components 140 are each included in server 102 and in the client devices 104*a-n*. Thus, in the example of FIG. 1, each of the client devices 104*a-n* and server 102 may be capable of performing any, or all, of the above-described video analysis techniques, audio analysis techniques, visual element modification techniques, and audio element modification techniques. In some examples, the above-described video analysis techniques, audio analysis techniques, visual element modification techniques, and/or audio element modification techniques may be performed entirely at the client devices 104. In some other examples, the above-described video analysis techniques, audio analysis techniques, visual element modification techniques, and/or audio element modification techniques may be performed entirely at the server 102.

In yet other examples, performance of the above-described video analysis techniques, audio analysis techniques, visual element modification techniques, and/or audio element modification techniques may be distributed between the client devices 104 and the server 102. For scenarios in which server 102 is employed to perform any, or all, of these techniques, the video input 114 and/or audio input 115 may be captured by a client device 104*a-n* (e.g., via camera 107 and/or microphone 105) and then provided to the server 102, via the one or more networks 132, for analysis, processing and/or modification. Additionally, in some examples, the results of the analysis, processing and/or modifications may be transmitted from server 102 to a client device 104*a-n* via the one or more networks 132. Specifically, in some examples, server 102 may perform a modification on visual element 164 and/or audio element 165. In other examples, server 102 may merely determine when a modification should be performed, and the server may transmit instructions for performing this modification back to a client device 104*a-n* to enable the modification to be performed on the client-side.

FIG. 3 shows an example process 300 for video creation input-based element modification which may be in accordance with the present disclosure. At operation 310, a first type of input is received via a first component of a computing device during creation of a video item, wherein the first type of input corresponds to a first type of element associated with the video item. In some examples, the receiving of the first type of input via the first component of the computing device may comprise receiving audio input via a microphone. As described above with reference to FIG. 2, the first type of input may be audio input 115, which may be received via microphone 105 during creation of video item 154. The audio input 115 may include, or may otherwise correspond to, a first type of element, such as audio element 165. The audio element 165 may include a feature of a voice of the user 101, such as pitch, tone, volume, energy, echo, or duration.

In some other examples, the receiving the first type of input via the first component of the computing device may comprise receiving video input via a camera. As described above, the first type of input may be video input 114, which may be received via camera 107 during creation of video item 154. The video input 114 may include, or may otherwise correspond to, a first type of element, such as visual element 164. In some examples, the visual element 164 may include body parts of the user 101, such as the user's eyes, eyebrows, mouth, lips, nose, hands, arms, and the like.

At operation 312, characteristics of signals in the first type of input are determined, based on the first type of input, in real time. The characteristics may change over time in the first type of input. In some examples, the characteristics may comprise a sound feature, and the sound feature may comprise at least one of pitch, tone, volume, energy, or duration. As described above, audio analysis components 125 may perform an audio analysis on the audio input 115 to determine audio signal characteristics 135. The audio signal characteristics 135 may comprise measurements of at least one of pitch, tone, volume, energy, or duration. In some examples, the audio analysis components 125 may employ one or more machine learning models, such as one or more neural network models, to perform the audio analysis on the audio input 115. In some cases, the audio analysis may include converting the audio input 115 into the frequency domain, such as by executing one or more frequency domain transforms (e.g., a Fourier transform or another similar transform) on the audio input 115. In some examples, the audio analysis may include determining audio signal characteristics 135, such as such as pitch, tone, volume and energy, at different times—as well as determining and tracking changes in those characteristics over time.

In some other examples, the characteristics may comprise a movement of at least one body part within the video input. As described above, video analysis components 124 may perform a video analysis on the video input 114 to determine video signal characteristics 134. The video signal characteristics 134 may comprise computations of a movement of at least one body part within the video input 114. In some examples, the video analysis components 124 may employ one or more machine learning models, such as one or more neural network models, to perform the video analysis on the video input 114. In some cases, the video analysis may include performing an object detection and/or object recognition analysis on different frames of the video input. The object detection and/or object recognition analysis may include a facial detection and/or facial recognition analysis. In some examples, the video analysis may include determining video signal characteristics 134, such as object locations, at different times—as well as determining and tracking changes in those locations over time.

At operation 314, at least one modification is caused to a second type of element associated with the video item based at least in part on the characteristics of the signals in the first type of input. The at least one modification may be caused, and performed, in real time upon determination of the characteristics of the signals in the first type of input that trigger the at least one modification. In some examples, the second type of element may comprise a visual element in the video item. As described above with reference to FIG. 2, modification component 140 may modify visual element 164 in the video item 154 based on audio signal characteristics 135 and audio-based modification instructions 145. For example, the audio-based modification instructions 145 may indicate various conditions for modifying a visual element 164 within the video item 154. Specifically, the audio-based modification instructions 145 may indicate changes in the audio signal characteristics 135 that may trigger a modification to visual element 164. In addition to specifying a triggering condition, the audio-based modification instructions 145 may also specify a modification that results from the triggering condition. In one specific example, operation 314 may include causing the visual element to stretch in at least one direction based on changing of at least one of the characteristics of the signals within the audio input. This example is described in detail below with reference to FIG. 5. In another specific example, operation 314 may include causing the visual element to shake based on changing of at least one of the characteristics of the signals within the audio input. This example is described in detail below with reference to FIG. 6. In another specific example, operation 314 may include inserting at least one animated graphical element into the video item based on changing of at least one of the characteristics of the signals within the audio input. This example is described in detail below with reference to FIG. 7. In another specific example, operation 314 may include causing a movement of the visual element based on changing of at least one of the characteristics of the signals within the audio input. This example is described in detail below with reference to FIG. 8.

In some other examples, the second type of element may comprise an audio element in audio output associated with the video item. As described above with reference to FIG. 2, modification component 140 may modify audio element 165 in the audio output 155 based on video signal characteristics 134 and video-based modification instructions 144. For example, the video-based modification instructions 144 may indicate various conditions for modifying the audio element 165 within the audio output 155. Specifically, the video-based modification instructions 144 may indicate changes in the video signal characteristics 134 that may trigger a modification to audio element 165. In addition to specifying a triggering condition, the video-based modification instructions 144 may also specify a modification that results from the triggering condition. In one specific example, operation 314 may include modifying a sound feature in the audio output based on the movement of at least one body part within the video input, wherein the sound feature comprises at least one of pitch, tone, volume, energy, echo, or duration. This example is described in detail below with reference to FIG. 10.

Figure 4:
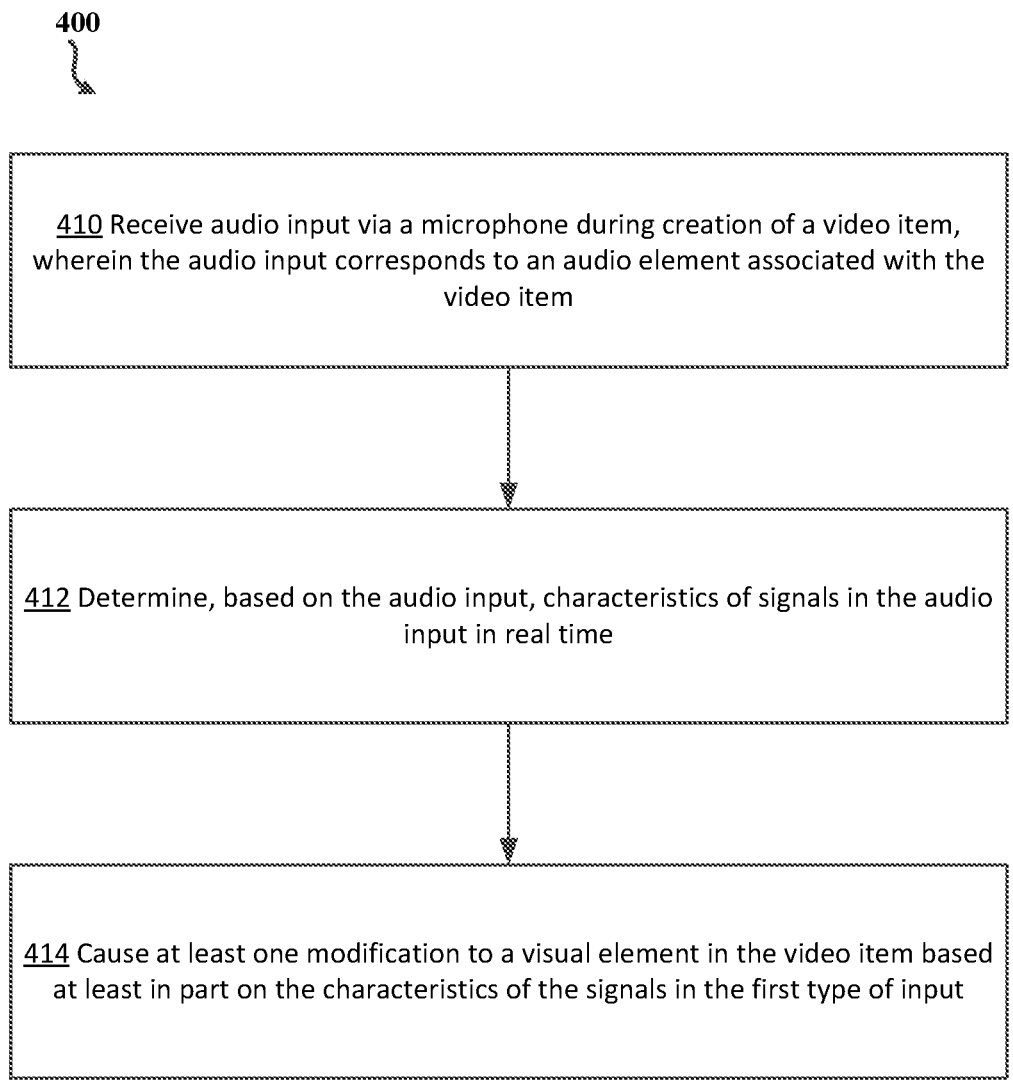
FIG. 4 shows an example method for audio input-based visual element modification which may be in accordance with the present disclosure.

FIG. 4 shows an example process 400 for audio input-based visual element modification which may be in accordance with the present disclosure. At operation 410, audio input is received via a microphone during creation of a video item, wherein the audio input corresponds to a voice element associated with the video item. As described above with reference to FIG. 2, audio input 115 may be received via microphone 105 during creation of video item 154. The audio input 115 may include, or may otherwise correspond to, a first type of element, such as audio element 165. The audio element 165 may include a feature of a voice of the user 101, such as pitch, tone, volume, energy, echo, or duration.

At operation 412, characteristics of signals in the audio of input are determined, based on the audio input, in real time. The characteristics may change over time in the audio input. In some examples, the characteristics may comprise a sound feature, and the sound feature may comprise at least one of pitch, tone, volume, energy, or duration. As described above, audio analysis components 125 may perform an audio analysis on the audio input 115 to determine audio signal characteristics 135. The audio signal characteristics 135 may comprise measurements of at least one of pitch, tone, volume, energy, or duration. In some examples, the audio analysis components 125 may employ one or more machine learning models, such as one or more neural network models, to perform the audio analysis on the audio input 115. In some cases, the audio analysis may include converting the audio input 115 into the frequency domain, such as by executing one or more frequency domain transforms (e.g., a Fourier transform or another similar transform) on the audio input 115. In some examples, the audio analysis may include determining audio signal characteristics 135, such as such as pitch, tone, volume and energy, at different times—as well as determining and tracking changes in those characteristics over time.

At operation 414, at least one modification is caused to a visual element in the video item based at least in part on the characteristics of the signals in the audio input. The at least one modification may be caused, and performed, in real time upon determination of the characteristics of the signals in the audio input that trigger the at least one modification. As described above with reference to FIG. 2, modification component 140 may modify visual element 164 in the video item 154 based on audio signal characteristics 135 and audio-based modification instructions 145. For example, the audio-based modification instructions 145 may indicate various conditions for modifying a visual element 164 within the video item 154. Specifically, the audio-based modification instructions 145 may indicate changes in the audio signal characteristics 135 that may trigger a modification to visual element 164. In addition to specifying a triggering condition, the audio-based modification instructions 145 may also specify a modification that results from the triggering condition. In some examples, sound features, such as pitch, tone, volume, energy, or duration may cause modifications to a visual element. The sound features may be features of a user's voice and/or other sounds, such as background sounds. Some specific examples of modifications that may be performed to the visual element at operation 414 are described in detail below with reference to FIGS. 5-8. In some examples, an object detection (e.g., facial detection) and/or object recognition (e.g., facial recognition) analysis may be performed, for example, by video analysis components 124, on a frame of the video input 114 and/or the video item 154 to determine locations of visual element 164, such as a body part (e.g., facial feature) or other object, with the frames. Upon determining the location of the visual element within the frame, the visual element may be modified by the modification components 140, such as by modifying pixel values or otherwise modifying the frame at the determined location of the visual element 164.

Figure 5:
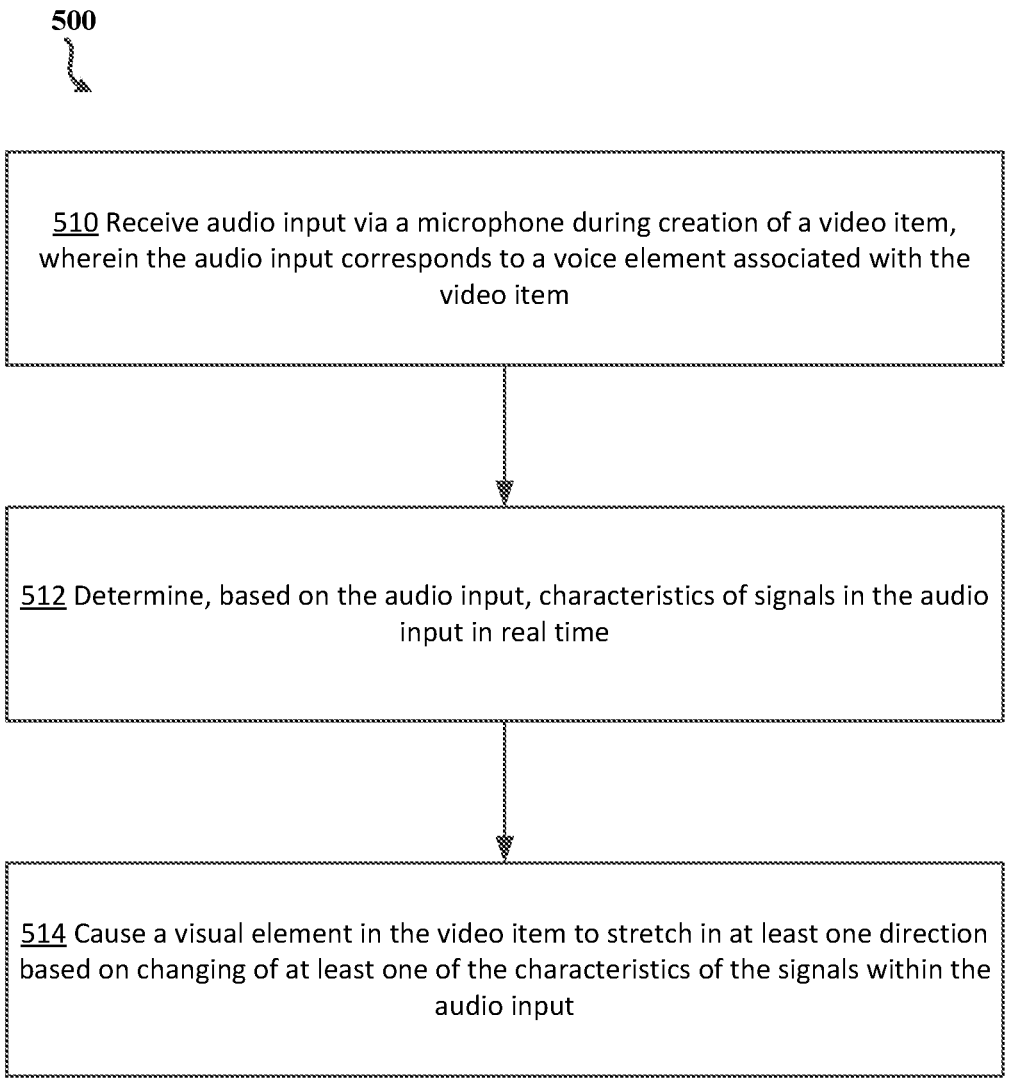
FIG. 5 shows another example method for audio input-based visual element modification which may be in accordance with the present disclosure.

Referring now to FIG. 5, an example process 500 is described in which the visual element is caused to stretch in at least one direction based on changing of at least one of the characteristics of the signals within the audio input. It is noted that operations 510 and 512 of FIG. 5 are identical to operations 410 and 412 of FIG. 4. Thus, the descriptions of operations 410 and 412 may be considered to apply to operations 510 and 512, respectively, and these descriptions are not repeated here. At operation 514 of FIG. 5, the visual element is caused to stretch in at least one direction based on changing of at least one of the characteristics of the signals within the audio input. The visual element may be caused to stretch in real time upon the changing of at least one of the characteristics of the signals within the audio input. As described with reference to FIG. 2, the visual element 164 may be a body part of the user 101, such as the user's face, eyes, eyebrows, mouth, lips, nose, hands, arms, and the like. Thus, the user's body parts may be caused to stretch in one or more directions (e.g., horizontal, vertical, diagonal, etc.). For example, in some cases, the user's face, including facial features such as eyes, mouth, nose, etc., may be stretched in one or more directions based on changes in the user's voice, such as changes in pitch, tone, volume, energy, and the like. Other objects, such as objects worn by the user (e.g., glasses, hat, etc.) and other background or foreground objects may also be stretched. In one specific example, the user's face may stretch in one or more directions based on changes in a pitch of the voice of user 101. For example, in some cases, an amount of stretching of the user's face may increase as the pitch of the user's voice increases, and the amount of stretching of the user's face may decrease as the pitch of the user's voice decreases. In one example, the user's face may begin to stretch once the pitch of the user's voice reaches a selected threshold pitch value, and the amount of stretching may increase as the pitch of the user's voice increases. The user's face may then cease to be stretched once the user stops talking or the pitch of the user's voice falls below the threshold pitch value. In some examples, an entire center portion of an image frame, which may often include the user's face, may be stretched horizontally such that a left-side portion and a right-side portion of the image frame are not displayed (e.g., are cut off) and only the stretched center portion of the image frame is displayed. Some example user interfaces that depict example stretching of a visual element are described in detail below with reference to FIGS. 11A-B.

Figure 6:
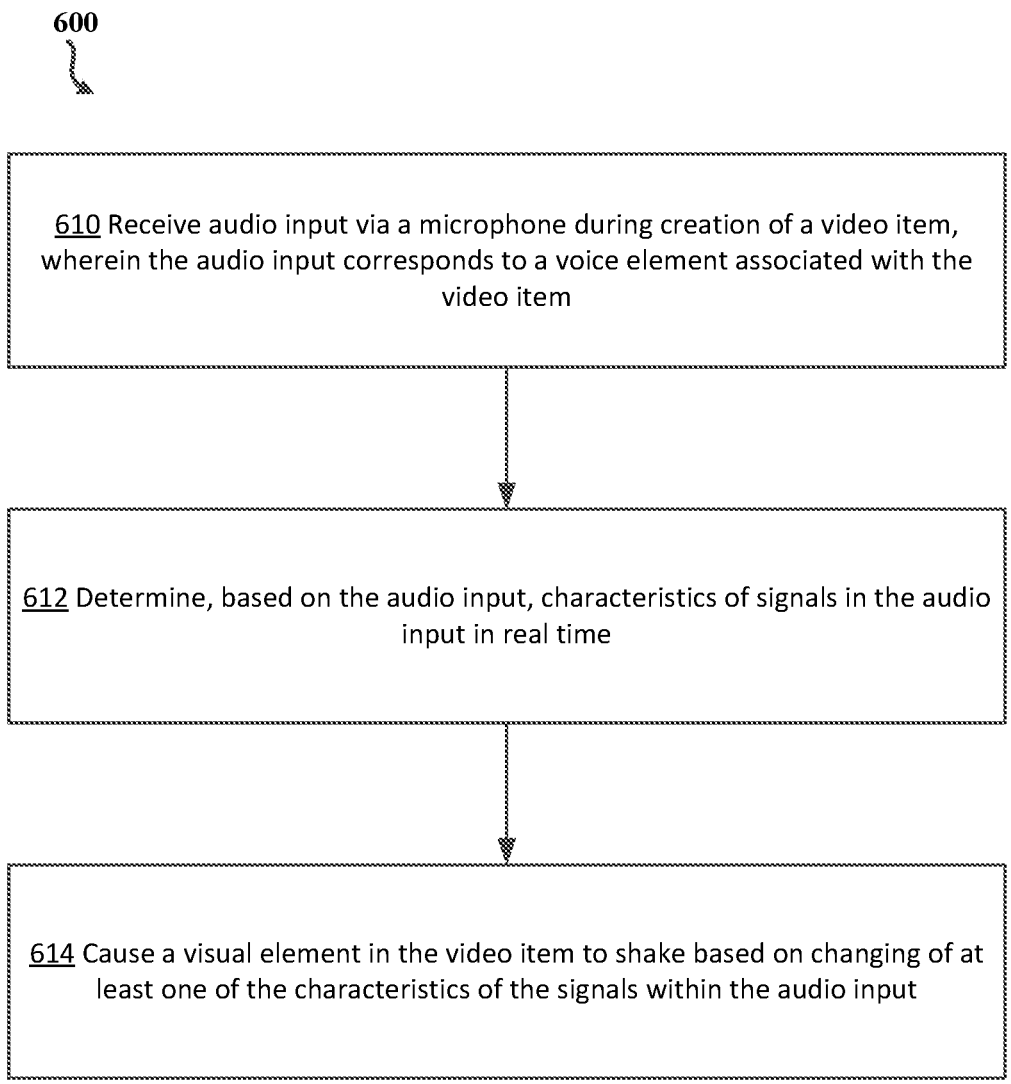
FIG. 6. shows another example method for audio input-based visual element modification which may be in accordance with the present disclosure.

Referring now to FIG. 6, an example process 600 is described in which the visual element is caused to shake based on changing of at least one of the characteristics of the signals within the audio input. It is noted that operations 610 and 612 of FIG. 6 are identical to operations 410 and 412 of FIG. 4. Thus, the descriptions of operations 410 and 412 may be considered to apply to operations 610 and 612, respectively, and these descriptions are not repeated here. At operation 614 of FIG. 6, the visual element is caused to shake based on changing of at least one of the characteristics of the signals within the audio input. The visual element may be caused to shake in real time upon the changing of at least one of the characteristics of the signals within the audio input. As described with reference to FIG. 2, the visual element 164 may be a body part of the user 101, such as the user's face, eyes, eyebrows, mouth, lips, nose, hands, arms, and the like. Thus, the user's body parts may be caused to shake. For example, in some cases, the user's face, including facial features such as eyes, mouth, nose, etc., may shake based on changes in the user's voice, such as changes in pitch, tone, volume, energy, and the like. Other objects, such as objects worn by the user (e.g., glasses, hat, etc.) and other background or foreground objects may also shake. In one specific example, the user's face may shake based on changes in a pitch of the voice of user 101. For example, in some cases, an amount of shaking of the user's face may increase as the pitch of the user's voice increases, and the amount of shaking of the user's face may decrease as the pitch of the user's voice decreases. In one example, the user's face may begin to shake once the pitch of the user's voice reaches a selected threshold pitch value, and the amount of shaking may increase as the pitch of the user's voice increases. The user's face may then cease to shake once the user stops talking or the pitch of the user's voice falls below the threshold pitch value. Some example user interfaces that depict example shaking of the visual element are described in detail below with reference to FIGS. 11A-B.

Referring now to FIG. 7, an example process 700 is described in which at least one animated graphical element is inserted into the video item based on changing of at least one of the characteristics of the signals within the audio input. It is noted that operations 710 and 712 of FIG. 7 are identical to operations 410 and 412 of FIG. 4. Thus, the descriptions of operations 410 and 412 may be considered to apply to operations 710 and 712, respectively, and these descriptions are not repeated here. At operation 714 of FIG. 7, at least one animated graphical element is inserted into the video item based on changing of at least one of the characteristics of the signals within the audio input. The at least one animated graphical element may be inserted into the video item in real time upon the changing of at least one of the characteristics of the signals within the audio input. For example, in some cases, increasing an intensity (e.g., volume, energy, etc.) of the user's voice may cause animated graphical elements, such as fireballs, to be inserted over the visual element, such as the user's eyeballs, for example to convey a sense of anger or rage. Additionally, in some examples, other animated graphical elements may also be displayed. For example, the background may be modified by causing animated rays or spikes to appear to emit from the user's face to also convey a sense of anger or rage. In some examples, the emission of the animated rays or spikes may be synchronized with the user's speech and may increase in size as the intensity of the user's voice increases. Additionally, in some cases, the user's voice may gradually assume a more metallic quality as the intensity of the user's voice is increased. Some example user interfaces that depict example insertion of animated graphical elements into the video item are described in detail below with reference to FIGS. 12A-B.

Figure 8:
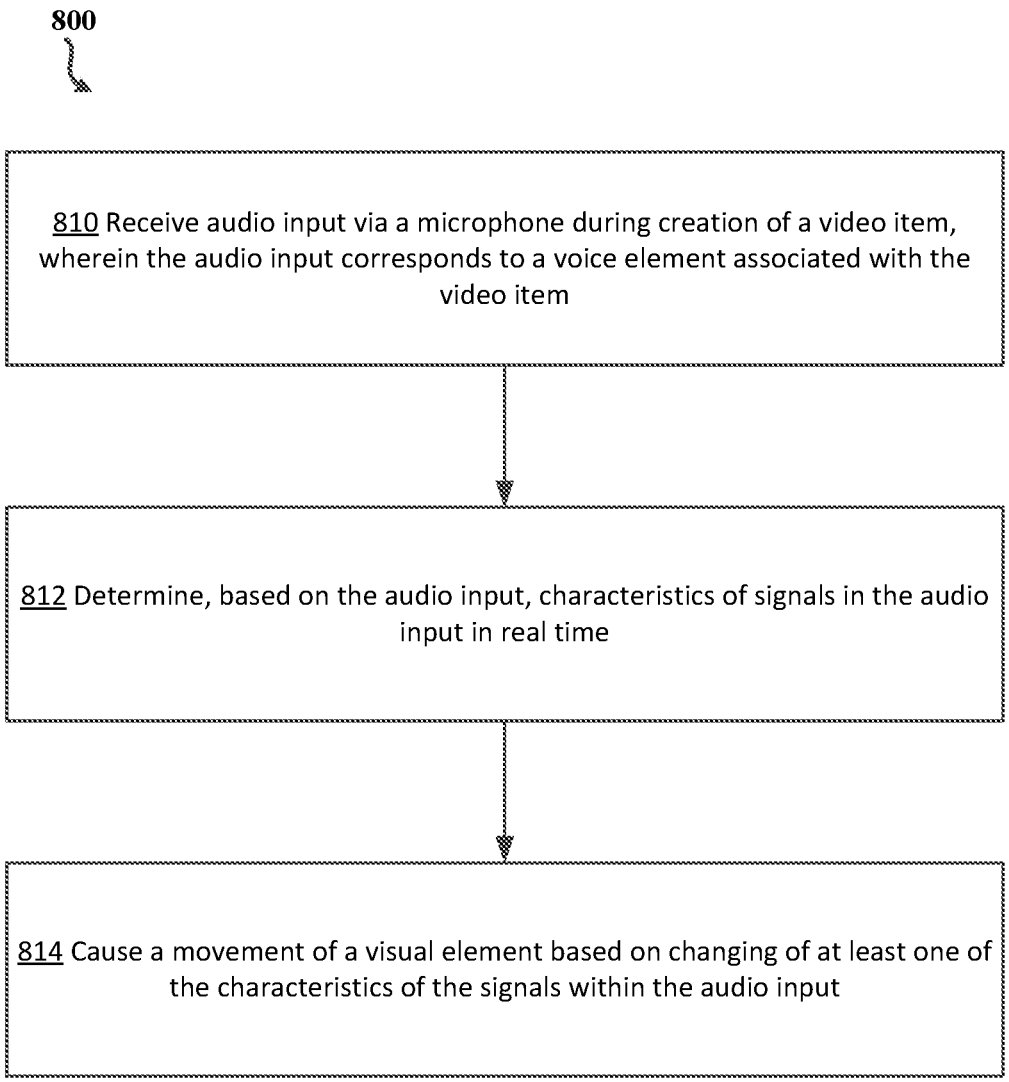
FIG. 8 shows another example method for audio input-based visual element modification which may be in accordance with the present disclosure.

Referring now to FIG. 8, an example process 800 is described in which a movement of the visual element is caused based on changing of at least one of the characteristics of the signals within the audio input. It is noted that operations 810 and 812 of FIG. 8 are identical to operations 410 and 412 of FIG. 4. Thus, the descriptions of operations 410 and 412 may be considered to apply to operations 810 and 812, respectively, and these descriptions are not repeated here. At operation 814 of FIG. 8, a movement of the visual element is caused based on changing of at least one of the characteristics of the signals within the audio input. The movement of the visual element may be caused in real time upon the changing of at least one of the characteristics of the signals within the audio input. For example, in some cases, the visual element may be an object in a game, such as a character controlled by the user. In some cases, changes in the pitch, or other vocal characteristic, of the user's voice may control movement of the visual element 164. For example, the character may move upwards as a pitch of the user's voice increases, and the character may move downwards as a pitch of the user's voice decreases. As another example, the character may move up as a volume of the user's voice increases, and the character may move downwards as a volume of the user's voice decreases. Some example user interfaces that depict example movement of the visual element based on changing of at least one of the characteristics of the signals within the audio input are described in detail below with reference to FIGS. 13A-B.

Figure 9:
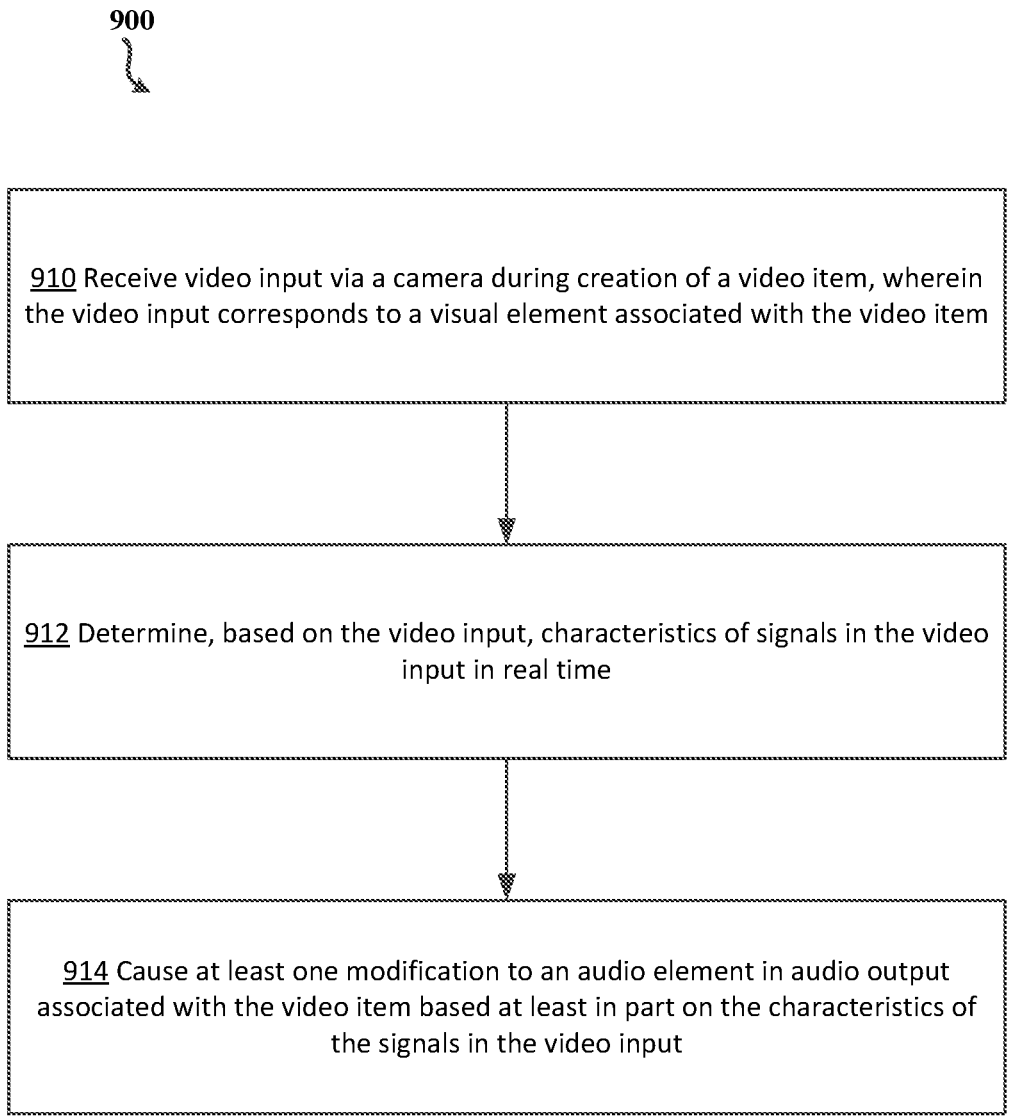
FIG. 9 shows an example method for video input-based audio element modification which may be in accordance with the present disclosure.

FIG. 9 shows an example process 900 for video input-based audio element modification which may be in accordance with the present disclosure. At operation 910, video input is received via a camera during creation of a video item, wherein the video input corresponds to a visual element associated with the video item. As described above with reference to FIG. 2, video input 114 may be received via camera 107 during creation of video item 154. The video input 114 may include, or may otherwise correspond to, a first type of element, such as visual element 164. In some examples, the visual element 164 may include body parts of the user 101, such as the user's eyes, eyebrows, mouth, lips, nose, hands, arms, and the like.

At operation 912, characteristics of signals in the video input are determined, based on the video input, in real time. The characteristics may change over time in the video input. In some examples, the characteristics may comprise a movement of at least one body part within the video input. As described above, video analysis components 124 may perform a video analysis on the video input 114 to determine video signal characteristics 134. The video signal characteristics 134 may comprise computations of a movement of at least one body part within the video input 114. In some examples, the video analysis components 124 may employ one or more machine learning models, such as one or more neural network models, to perform the video analysis on the video input 114. In some examples, the video analysis may include performing an object detection and/or object recognition analysis on different frames of the video input. The object detection and/or object recognition analysis may include a facial detection and/or facial recognition analysis. In some examples, the video analysis may include determining video signal characteristics 134, such as object locations, at different times—as well as determining and tracking changes in those locations over time.

At operation 914, at least one modification is caused to an audio element in audio output associated with the video item based at least in part on the characteristics of the signals in the video input. The at least one modification may be caused, and performed, in real time upon determination of the characteristics of the signals in the video input that trigger the at least one modification. As described above with reference to FIG. 2, modification component 140 may modify audio element 165 in the audio output 155 based on video signal characteristics 134 and video-based modification instructions 144. For example, the video-based modification instructions 144 may indicate various conditions for modifying the audio element 165 within the audio output 155. Specifically, the video-based modification instructions 144 may indicate changes in the video signal characteristics 134 that may trigger a modification to audio element 165. In addition to specifying a triggering condition, the video-based modification instructions 144 may also specify a modification that results from the triggering condition. In one specific example, operation 914 may include modifying a sound feature in the audio output based on the movement of at least one body part within the video input, wherein the sound feature comprises at least one of pitch, tone, volume, energy, echo, or duration. This example is described in detail below with reference to FIG. 10. In some examples, a sound feature of a user's voice, such pitch, tone, volume, energy, echo, or duration, may be modified by modifying the audio input 115 to create the desired sound effect. For example, in some cases, audio analysis components 125 may analyze the audio input 115 to detect data within the audio input that corresponds to the user's voice, such as by filtering out background sounds, noise, and other non-voice audio data. The modification components 140 may then modify the remaining data in the audio input 115 that corresponds to the user's voice to achieve the desired effect.

Referring now to FIG. 10, an example process 1000 is described in which the visual element is caused to stretch in at least one direction based on changing of at least one of the characteristics of the signals within the audio input. It is noted that operations 1010 of FIG. is identical to operation 910 of FIG. 9. Thus, the descriptions of operation 910 may be considered to apply to operation 1010, and this description is not repeated here. At operation 1012 of FIG. 10, characteristics of signals in the video input are determined, based on the video input, in real time, wherein the characteristics comprise a movement of at least one body part within the video input. As described above, video analysis components 124 may perform a video analysis on the video input 114 to determine video signal characteristics 134. The video signal characteristics 134 may comprise computations of a movement of at least one body part within the video input 114. In some examples, the video analysis components 124 may employ one or more machine learning models, such as one or more neural network models, to perform the video analysis on the video input 114. In some cases, the video analysis may include performing an object detection and/or object recognition analysis on different frames of the video input. The object detection and/or object recognition analysis may include a facial detection and/or facial recognition analysis. In some examples, the video analysis may include determining video signal characteristics 134, such as object locations, at different times—as well as determining and tracking changes in those locations over time.

At operation 1014, a sound feature in the audio output is modified based on the movement of the at least one body part within the video input, wherein the sound feature comprises at least one of pitch, tone, volume, energy, echo, or duration. The sound feature may be modified in real time upon the movement of the at least one body part within the video input. In one specific example, the user 101 may move his or her eyebrows to cause to cause a pitch of the user's voice to change. For example, the eyebrows may be moved up to raise the pitch of the user's voice, and the eyebrows may be moved down to lower the pitch of the user's voice. In another specific example, movement of a body part or other object may cause an echoing effect. For example, a body part may be raised upwards to increase an echoing effect, such as to transform the user's voice in real time to achieve an angelic sounding echo. The body part may also be lowered to decrease the echoing effect.

Figure 11A:
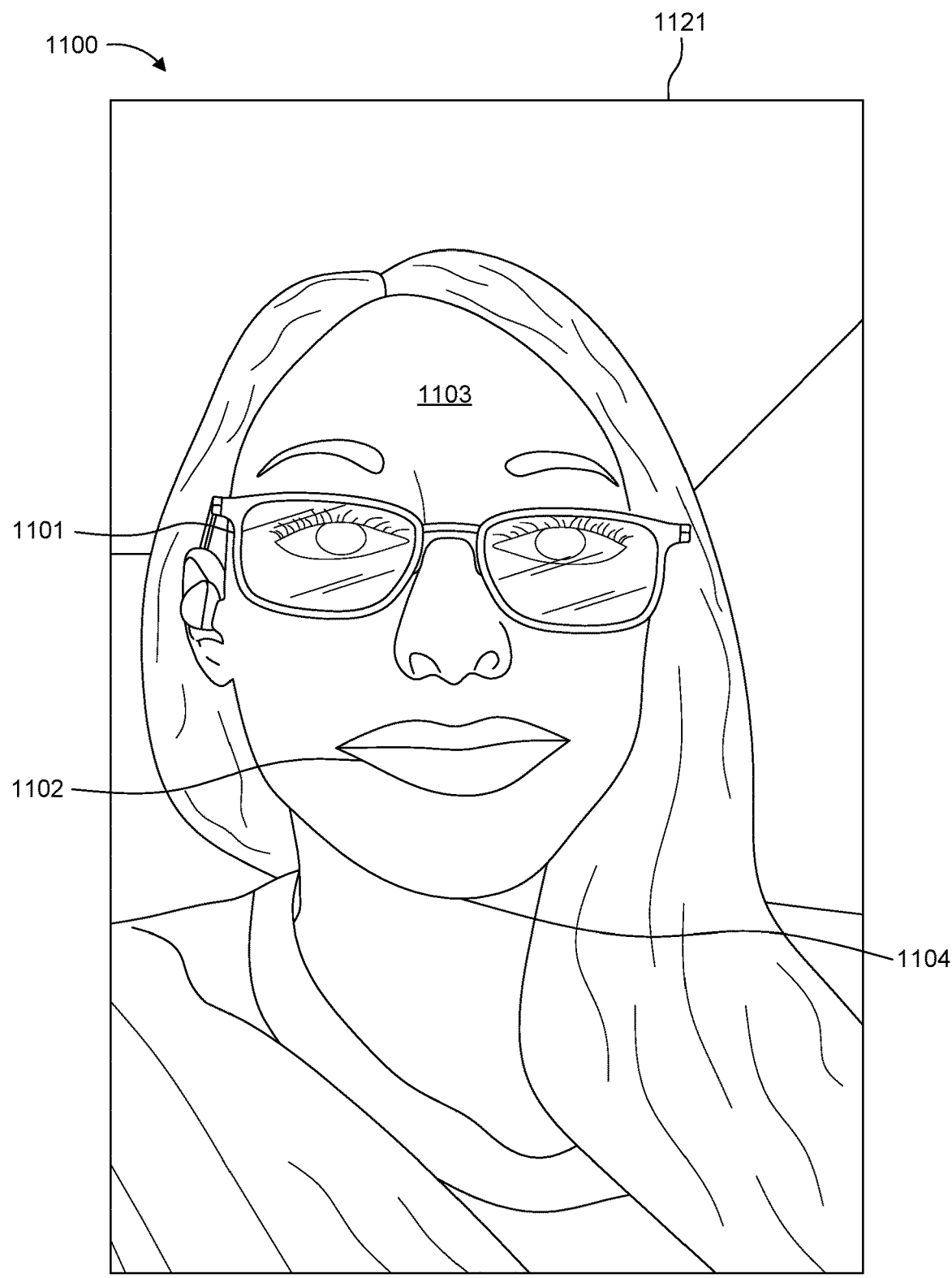
FIG. 11A shows an example user interface which may be in accordance with the present disclosure.
Figure 11B:
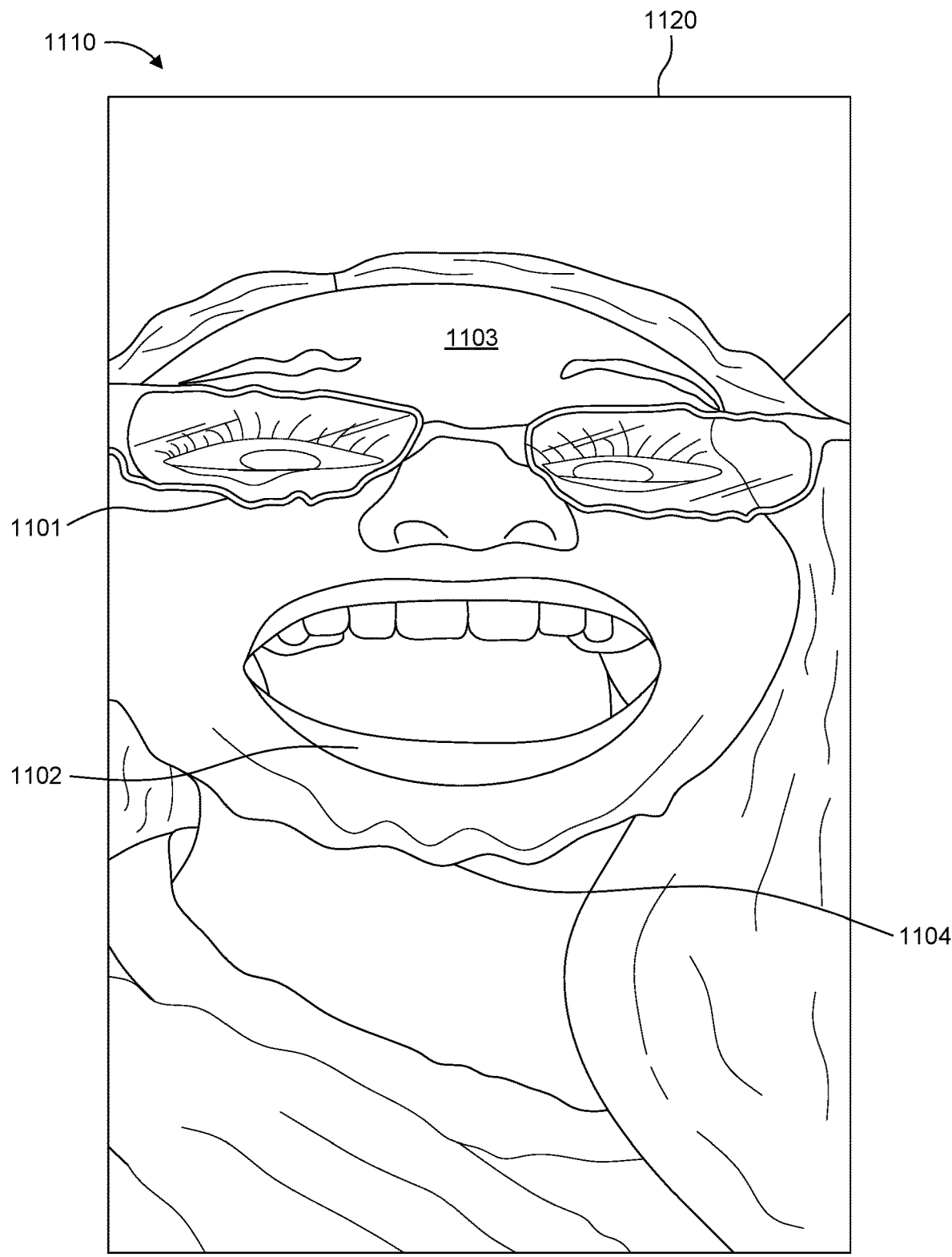
FIG. 11B shows another example user interface which may be in accordance with the present disclosure.

Some example user interfaces will now be described that depict examples of effects described above. In particular, FIGS. 11A-B depict examples relating to stretching and shaking of a visual element based on changing of at least one of the characteristics of the signals within the audio input. Specifically, FIG. 11A shows a user interface 1100 prior to performance of the stretching and shaking effects. As shown, user interface 1100 shows a frame 1120 of a video item that includes a face 1103 of a user. The face 1103 includes mouth 1102 and a chin 1104. The user wears glasses 1101. Referring now to FIG. 11B, a user interface 1110 is shown that includes a frame 1121 of the same video item in which both a stretching effect and a shaking effect are applied. As shown in frame 1121, the face 1103 has been stretched horizontally. For example, the face 1103 is wider in frame 1121 than in frame 1120. In particular, the glasses 1101, mouth 1102 and chin 1104 (as well as other facial features) are stretched wider in frame 1121 of FIG. 11B than they appear in frame 1120 of FIG. 11A. Additionally, a shaking effect is applied in frame 1121. For example, in frame 1121, the glasses 1101 and chin 1104 appear wavy, such as with some edges that have an up and down pattern, for example instead of being straight or curved. When applied to multiple frames in a video, this wavy appearance may create a shaking effect in which objects appear to shake.

The stretching and shaking effect in frame 1121 may be applied based on changing of at least one of the characteristics of the signals within the audio input. For example, in some cases, visual elements, such as face 1103, glasses 1101, mouth 1102 and/or chin 1104, may be stretched in one or more directions based on changes in the user's voice, such as changes in pitch, tone, volume, energy, and the like. In one specific example, the visual elements may stretch in one or more directions based on changes in a pitch of the voice of user. For example, in some cases, an amount of stretching of the user's face may increase as the pitch of the user's voice increases, and the amount of stretching of the user's face may decrease as the pitch of the user's voice decreases. Thus, at the time that frame 1121 is generated, the pitch of the user's voice may be higher than the pitch of the user's voice at the time that frame 1120 is generated. This increase in pitch may cause the stretching and shaking effects to be applied to frame 1121.

Figure 12A:
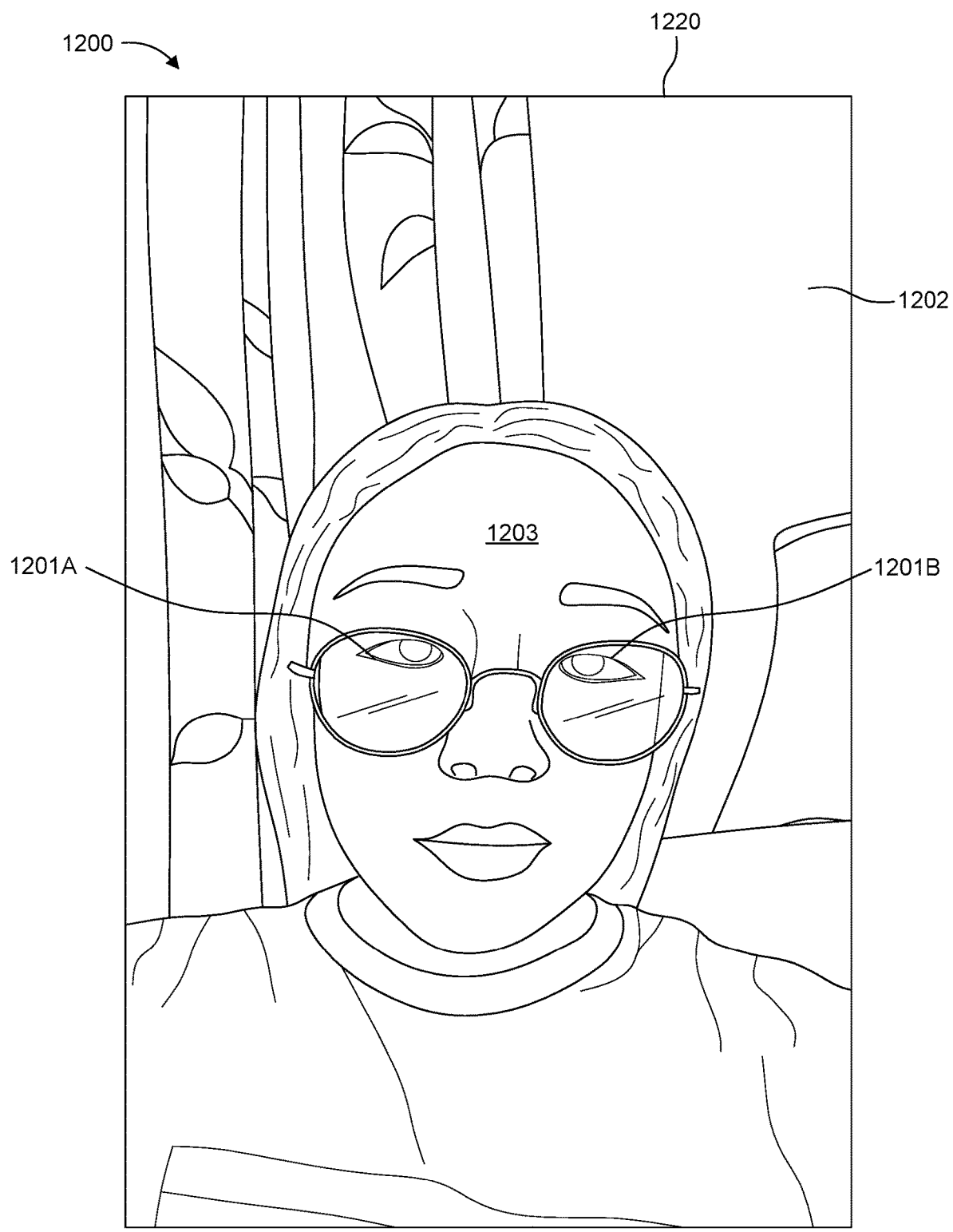
FIG. 12A shows another example user interface which may be in accordance with the present disclosure.
Figure 12B:
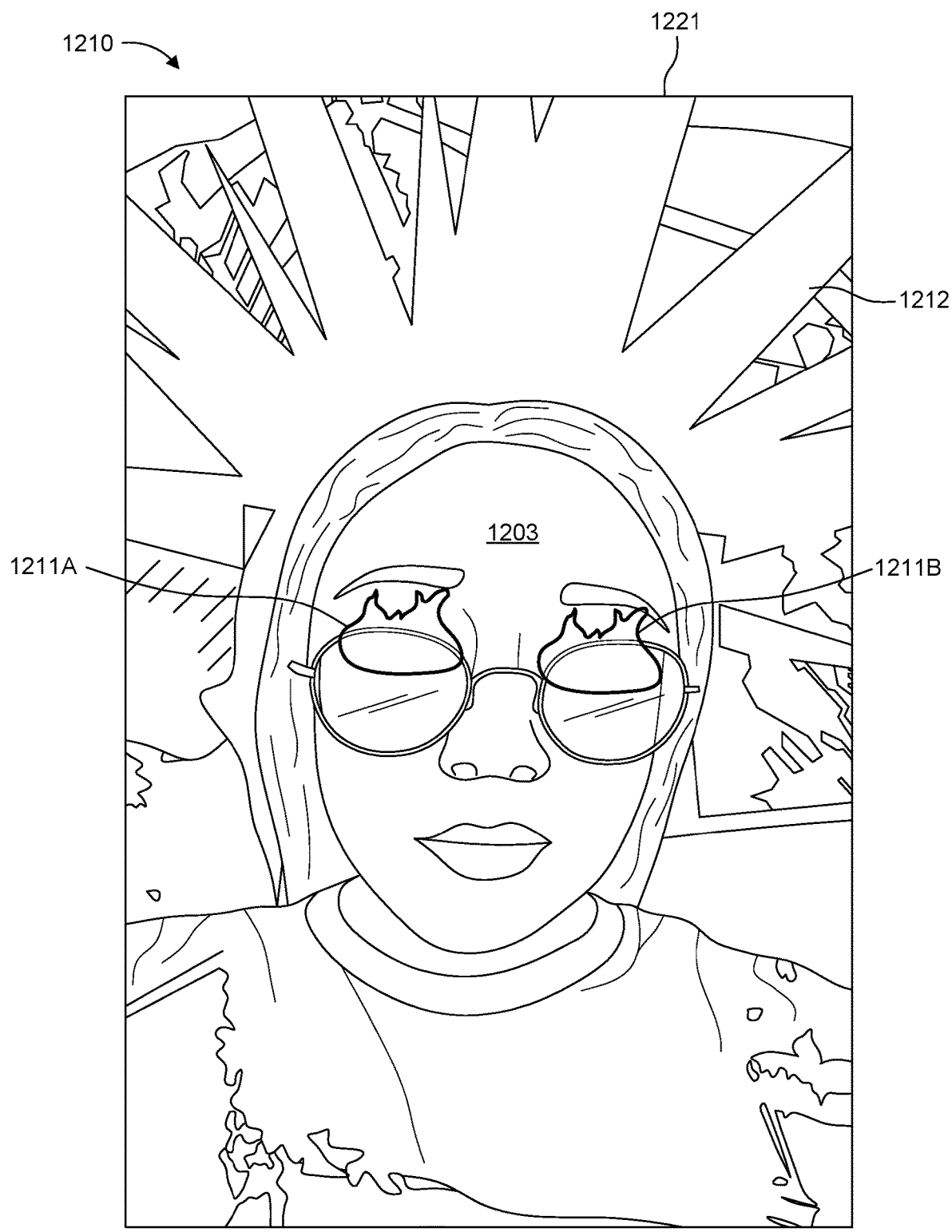
FIG. 12B shows another example user interface which may be in accordance with the present disclosure.

FIGS. 12A-B depict examples relating to inserting at least one animated graphical element into the video item based on changing of at least one of the characteristics of the signals within the audio input. Specifically, FIG. 12A shows a user interface 1200 that shows a frame 1220 of a video item that includes a face 1203 of a user. The face 1203 includes eyes 1201A-B. The user is positioned in front of a background 1202. Referring now to FIG. 12B, a user interface 1210 is shown that includes a frame 1221 of the same video item in which animated graphical object insertion is performed. As shown in frame 1221, fireballs 1211A-B are inserted into frame 1221 at the locations of eyes 1201A-B, for example to convey a sense of anger or rage. Thus, the user's eyes 1201A-B are obscured by fireballs 1211A-B in FIG. 12. In some examples, the user's eyes 1201A-B may only be partially obscured by the fireballs 1211A-B and, therefore, may be partially visible. Accordingly, the fireballs 1211A-B modify visual elements (e.g., eyes 1201A-B) by obscuring their view and changing their appearance. Additionally, background 1202 is obscured by a background animation 1212. The background animation 1212 includes animated rays that emit from the user's face 1203 to also convey a sense of anger or rage. In some examples, the emission of the animated rays or spikes may be synchronized with the user's speech and may increase in size as the intensity of the user's voice increases. Both the fireballs 1211A-B and the background animation 1212 may be inserted into the video item in real time upon the changing of at least one of the characteristics of the signals within the audio input. In some examples, increasing an intensity (e.g., volume, energy, etc.) of the user's voice may cause animated graphical elements, such as fireballs 1211A-B and the background animation 1212, to be inserted into the video item. Additionally, decreasing an intensity (e.g., volume, energy, etc.) of the user's voice may cause animated graphical elements, such as fireballs 1211A-B and the background animation 1212, to stop being inserted into the video item.

Figure 13A:
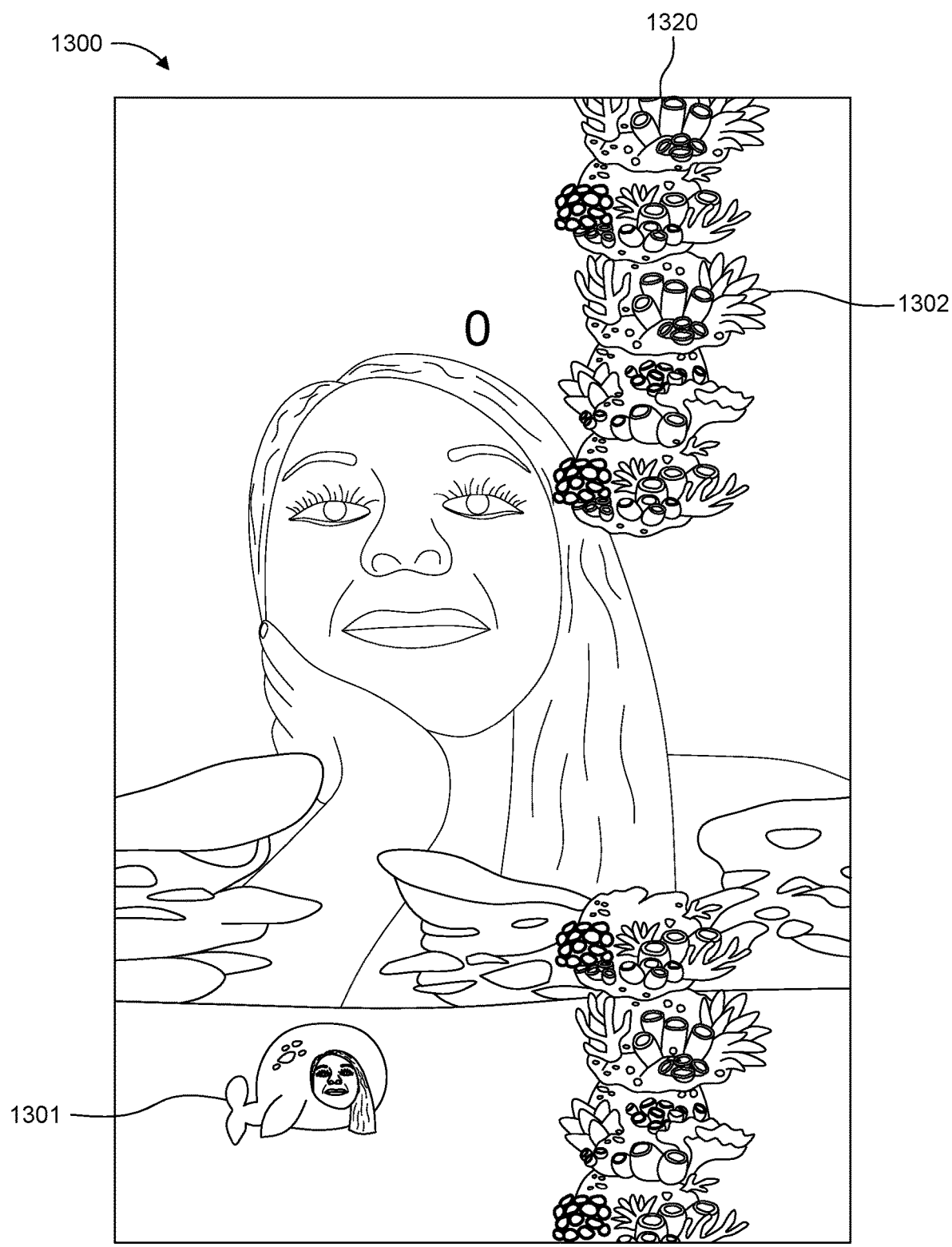
FIG. 13A shows another example user interface which may be in accordance with the present disclosure.
Figure 13B:
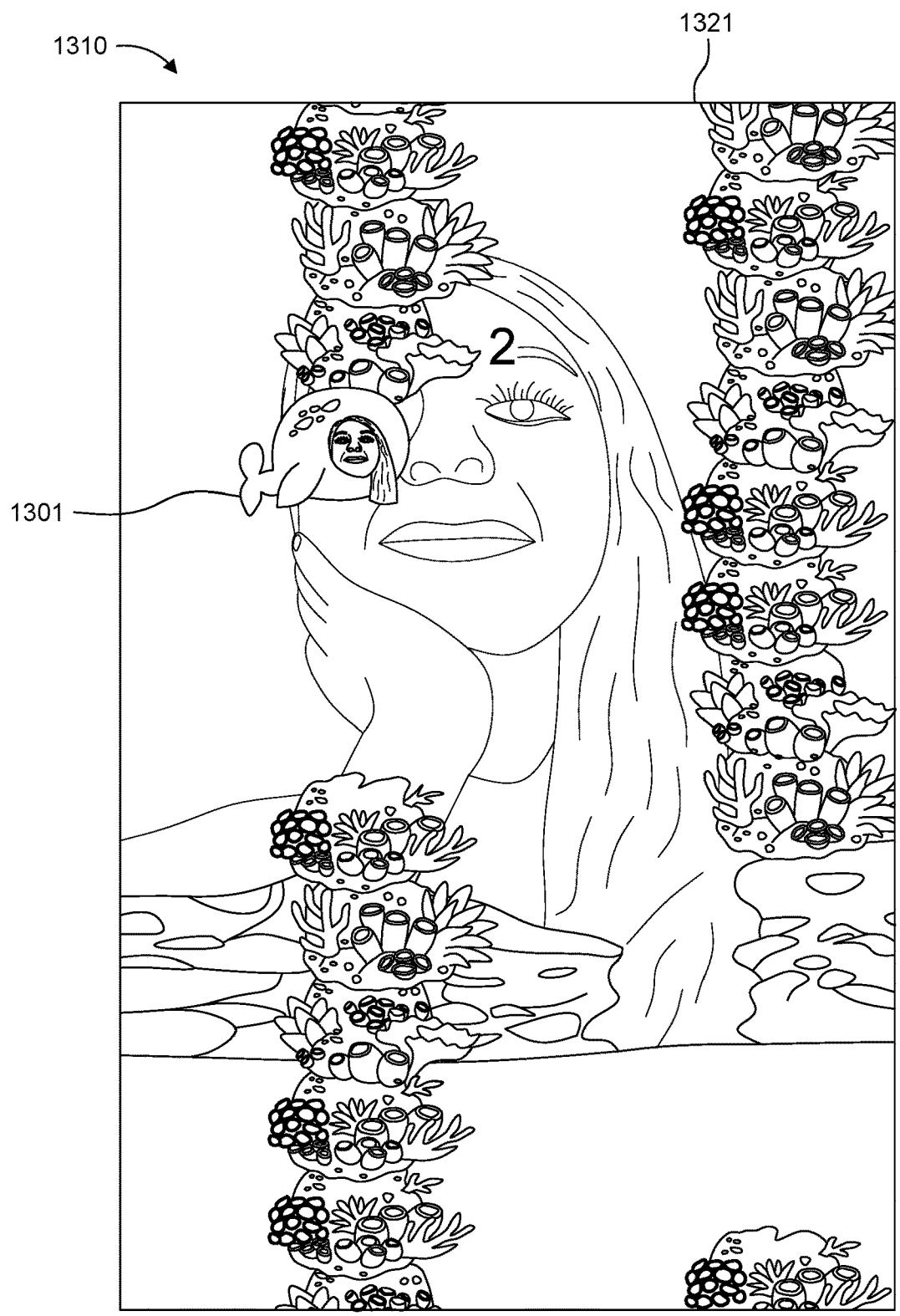
FIG. 13B shows another example user interface which may be in accordance with the present disclosure.

FIGS. 13A-B depict examples relating to moving of a visual element based on changing of at least one of the characteristics of the signals within the audio input. Specifically, FIG. 13A shows a user interface 1300 that shows a frame 1320 of a video item. In this example, the video item is a video game in which a user controls movement of a character 1301 within the video game. The character 1301 is a movable sea creature that includes an image of the user's face. The game includes sea coral 1302 that moves across the screen from right to left, and the user can score points in the game by causing the character 1301 to interact with (e.g., contact) the sea coral 1302 as it moves across the screen. Referring now to FIG. 13B, a user interface 1310 is shown that includes a frame 1321 of the same video item. As shown in frame 1321, the character 1301 has been moved upwards from its prior location in frame 1320. In this example, movement of character 1301 is caused based on changing of at least one of the characteristics of the signals within the audio input. The movement of the character 1301 may be caused in real time upon the changing of at least one of the characteristics of the signals within the audio input. In some cases, changes in the pitch, or other vocal characteristics, of the user's voice may control movement of the character 1301. For example, the character may move upwards as a pitch of the user's voice increases, and the character may move downwards as a pitch of the user's voice decreases. As another example, the character may move up as a volume of the user's voice increases, and the character may move downwards as a volume of the user's voice decreases.

Figure 14:
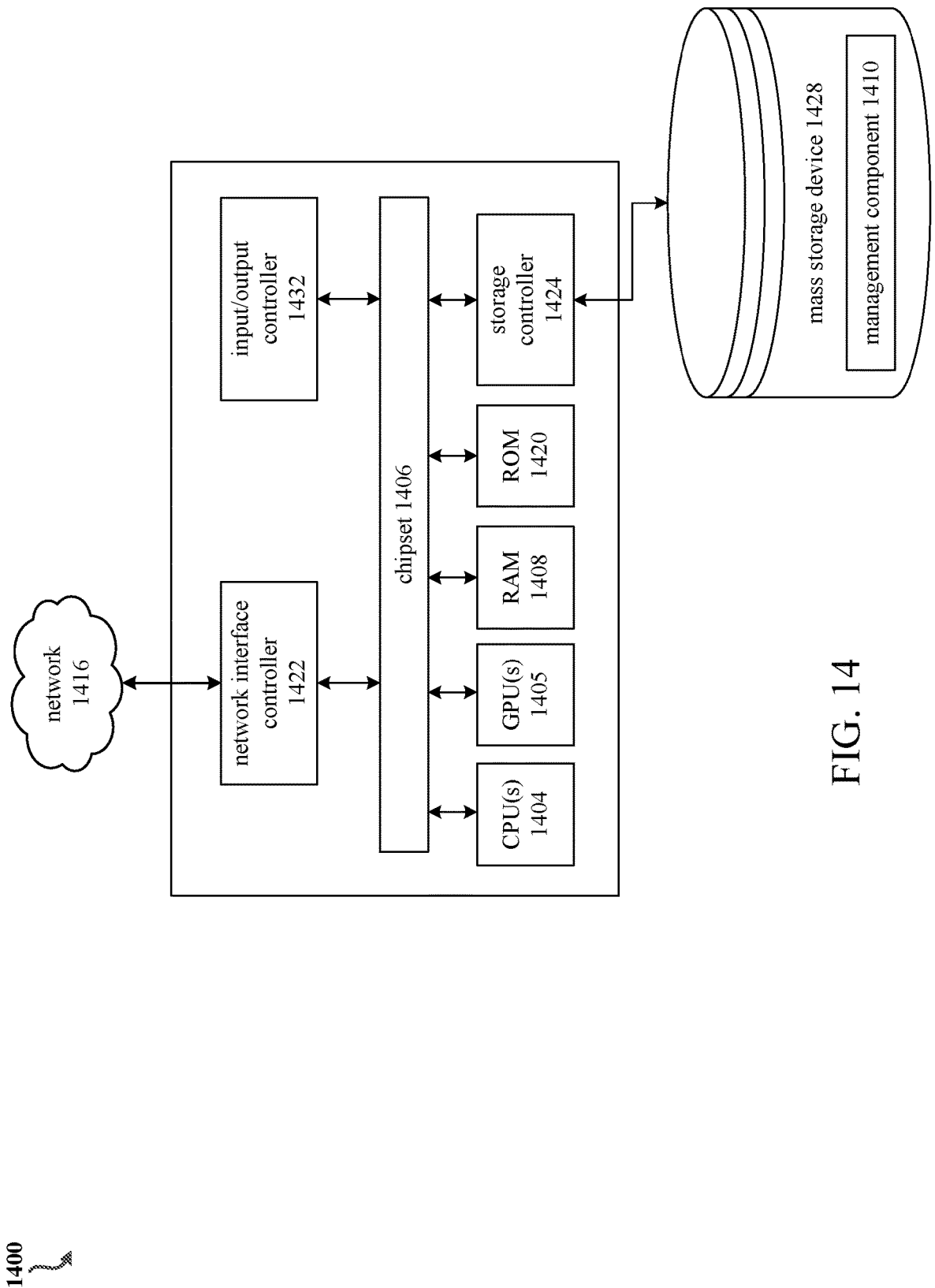
FIG. 14 shows an example computing device which may be used to perform any of the techniques disclosed herein.

FIG. 14 illustrates a computing device that may be used in various aspects, such as the services, networks, modules, and/or devices depicted in FIG. 1. With regard to the example architecture of FIG. 1, the message service, interface service, processing service, content service, cloud network, and client may each be implemented by one or more instance of a computing device 1400 of FIG. 14. The computer architecture shown in FIG. 14 shows a conventional server computer, workstation, desktop computer, laptop, tablet, network appliance, PDA, e-reader, digital cellular phone, or other computing node, and may be utilized to execute any aspects of the computers described herein, such as to implement the methods described herein.

The computing device 1400 may include a baseboard, or "motherboard," which is a printed circuit board to which a multitude of components or devices may be connected by way of a system bus or other electrical communication paths. One or more central processing units (CPUs) 1404 may operate in conjunction with a chipset 1406. The CPU(s) 1404 may be standard programmable processors that perform arithmetic and logical operations necessary for the operation of the computing device 1400.

The CPU(s) 1404 may perform the necessary operations by transitioning from one discrete physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits including registers, adders-subtractors, arithmetic logic units, floating-point units, and the like.

The CPU(s) 1404 may be augmented with or replaced by other processing units, such as GPU(s) 1405. The GPU(s) 1405 may comprise processing units specialized for but not necessarily limited to highly parallel computations, such as graphics and other visualization-related processing.

A chipset 1406 may provide an interface between the CPU(s) 1404 and the remainder of the components and devices on the baseboard. The chipset 1406 may provide an interface to a random-access memory (RAM) 1408 used as the main memory in the computing device 1400. The chipset 1406 may further provide an interface to a computer-readable storage medium, such as a read-only memory (ROM) 1420 or non-volatile RAM (NVRAM) (not shown), for storing basic routines that may help to start up the computing device 1400 and to transfer information between the various components and devices. ROM 1420 or NVRAM may also store other software components necessary for the operation of the computing device 1400 in accordance with the aspects described herein.

The computing device 1400 may operate in a networked environment using logical connections to remote computing nodes and computer systems through local area network (LAN). The chipset 1406 may include functionality for providing network connectivity through a network interface controller (NIC) 1422, such as a gigabit Ethernet adapter. A NIC 1422 may be capable of connecting the computing device 1400 to other computing nodes over a network 1416. It should be appreciated that multiple NICs 1422 may be present in the computing device 1400, connecting the computing device to other types of networks and remote computer systems.

The computing device 1400 may be connected to a mass storage device 1428 that provides non-volatile storage for the computer. The mass storage device 1428 may store system programs, application programs, other program modules, and data, which have been described in greater detail herein. The mass storage device 1428 may be connected to the computing device 1400 through a storage controller 1424 connected to the chipset 1406. The mass storage device 1428 may consist of one or more physical storage units. The mass storage device 1428 may comprise a management component 1410. A storage controller 1424 may interface with the physical storage units through a serial attached SCSI (SAS) interface, a serial advanced technology attachment (SATA) interface, a fiber channel (FC) interface, or other type of interface for physically connecting and transferring data between computers and physical storage units.

The computing device 1400 may store data on the mass storage device 1428 by transforming the physical state of the physical storage units to reflect the information being stored. The specific transformation of a physical state may depend on various factors and on different implementations of this description. Examples of such factors may include, but are not limited to, the technology used to implement the physical storage units and whether the mass storage device 1428 is characterized as primary or secondary storage and the like.

For example, the computing device 1400 may store information to the mass storage device 1428 by issuing instructions through a storage controller 1424 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computing device 1400 may further read information from the mass storage device 1428 by detecting the physical states or characteristics of one or more particular locations within the physical storage units.

In addition to the mass storage device 1428 described above, the computing device 1400 may have access to other computer-readable storage media to store and retrieve information, such as program modules, data structures, or other data. It should be appreciated by those skilled in the art that computer-readable storage media may be any available media that provides for the storage of non-transitory data and that may be accessed by the computing device 1400.

By way of example and not limitation, computer-readable storage media may include volatile and non-volatile, transitory computer-readable storage media and non-transitory computer-readable storage media, and removable and non-removable media implemented in any method or technology. Computer-readable storage media includes, but is not limited to, RAM, ROM, erasable programmable ROM ("EPROM"), electrically erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage, other magnetic storage devices, or any other medium that may be used to store the desired information in a non-transitory fashion.

A mass storage device, such as the mass storage device 1428 depicted in FIG. 14, may store an operating system utilized to control the operation of the computing device 1400. The operating system may comprise a version of the LINUX operating system. The operating system may comprise a version of the WINDOWS SERVER operating system from the MICROSOFT Corporation. According to further aspects, the operating system may comprise a version of the UNIX operating system. Various mobile phone operating systems, such as IOS and ANDROID, may also be utilized. It should be appreciated that other operating systems may also be utilized. The mass storage device 1428 may store other system or application programs and data utilized by the computing device 1400.

The mass storage device 1428 or other computer-readable storage media may also be encoded with computer-executable instructions, which, when loaded into the computing device 1400, transforms the computing device from a general-purpose computing system into a special-purpose computer capable of implementing the aspects described herein. These computer-executable instructions transform the computing device 1400 by specifying how the CPU(s) 1404 transition between states, as described above. The computing device 1400 may have access to computer-readable storage media storing computer-executable instructions, which, when executed by the computing device 1400, may perform the methods described herein.

A computing device, such as the computing device 1400 depicted in FIG. 14, may also include an input/output controller 1432 for receiving and processing input from a number of input devices, such as a keyboard, a mouse, a touchpad, a touch screen, an electronic stylus, or other type of input device. Similarly, an input/output controller 1432 may provide output to a display, such as a computer monitor, a flat-panel display, a digital projector, a printer, a plotter, or other type of output device. It will be appreciated that the computing device 1400 may not include all of the components shown in FIG. 14, may include other components that are not explicitly shown in FIG. 14, or may utilize an architecture completely different than that shown in FIG. 14.

As described herein, a computing device may be a physical computing device, such as the computing device 1400 of FIG. 14. A computing node may also include a virtual machine host process and one or more virtual machine instances. Computer-executable instructions may be executed by the physical hardware of a computing device indirectly through interpretation and/or execution of instructions stored and executed in the context of a virtual machine.

It is to be understood that the methods and systems are not limited to specific methods, specific components, or to particular implementations. It is also to be understood that the terminology used herein is for the purpose of describing particular embodiments only and is not intended to be limiting.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Components are described that may be used to perform the described methods and systems. When combinations, subsets, interactions, groups, etc., of these components are described, it is understood that while specific references to each of the various individual and collective combinations and permutations of these may not be explicitly described, each is specifically contemplated and described herein, for all methods and systems. This applies to all aspects of this application including, but not limited to, operations in described methods. Thus, if there are a variety of additional operations that may be performed it is understood that each of these additional operations may be performed with any specific embodiment or combination of embodiments of the described methods.

The present methods and systems may be understood more readily by reference to the following detailed description of preferred embodiments and the examples included therein and to the Figures and their descriptions.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices.

Embodiments of the methods and systems are described below with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, may be implemented by computer program instructions. These computer program instructions may be loaded on a general-purpose computer, special-purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that may direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

The various features and processes described above may be used independently of one another, or may be combined in various ways. All possible combinations and sub-combinations are intended to fall within the scope of this disclosure. In addition, certain methods or process blocks may be omitted in some implementations. The methods and processes described herein are also not limited to any particular sequence, and the blocks or states relating thereto may be performed in other sequences that are appropriate. For example, described blocks or states may be performed in an order other than that specifically described, or multiple blocks or states may be combined in a single block or state. The example blocks or states may be performed in serial, in parallel, or in some other manner. Blocks or states may be added to or removed from the described example embodiments. The example systems and components described herein may be configured differently than described. For example, elements may be added to, removed from, or rearranged compared to the described example embodiments.

It will also be appreciated that various items are illustrated as being stored in memory or on storage while being used, and that these items or portions thereof may be transferred between memory and other storage devices for purposes of memory management and data integrity. Alternatively, in other embodiments, some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits ("ASICs"), standard integrated circuits, controllers (e.g., by executing appropriate instructions, and including microcontrollers and/or embedded controllers), field-programmable gate arrays ("FPGAs"), complex programmable logic devices ("CPLDs"), etc. Some or all of the modules, systems, and data structures may also be stored (e.g., as software instructions or structured data) on a computer-readable medium, such as a hard disk, a memory, a network, or a portable media article to be read by an appropriate device or via an appropriate connection. The systems, modules, and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its operations be performed in a specific order. Accordingly, where a method claim does not actually recite an order to be followed by its operations or it is not otherwise specifically stated in the claims or descriptions that the operations are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; and the number or type of embodiments described in the specification.

It will be apparent to those skilled in the art that various modifications and variations may be made without departing from the scope or spirit of the present disclosure. Other embodiments will be apparent to those skilled in the art from consideration of the specification and practices described herein. It is intended that the specification and example figures be considered as exemplary only, with a true scope and spirit being indicated by the following claims.

What is claimed is:

1. A method, comprising:
receiving audio input via a first component of a computing device during creation of a video item, wherein the audio input corresponds to an audio element associated with the video item;
determining, based on the audio input, characteristics of signals in the audio input in real time, wherein the characteristics change over time in the audio input;
determining a particular type of change in the characteristics of the signals in the audio input;
determining at least one modification instruction based on the particular type of the change in the characteristics of the signals, wherein the at least one modification instruction indicates a particular type of modification to be made to a visual element captured by a camera associated with the video item; and
causing the particular type of modification to the visual element captured by the camera associated with the video item based on the characteristics of the signals in the audio input, wherein the causing the particular type of modification to the visual element based on the characteristics of the signals in the audio input comprises:
inserting at least one animated graphical element over the visual element to replace or obscure at least a portion of the visual element based on a change in intensity of the signals in the audio input.

2. The method of claim 1, wherein the receiving the audio input via the first component of the computing device comprises receiving the audio input via a microphone.

3. The method of claim 2, wherein the characteristics comprise a sound feature, and wherein the sound feature comprises at least one of pitch, tone, volume, energy, or duration.

4. The method of claim 1, wherein the causing the particular type of modification to the visual element based on the characteristics of the signals in the audio input further comprises moving the visual element based on the change in pitch of the signals in the audio input by shaking the visual element based on an increase in the pitch of the signals in the audio input.

5. The method of claim 1, wherein the inserting at least one animated graphical element over the visual element based on a change in the intensity of the signals in the audio input comprises inserting the at least one animated graphical element over the visual element based on an increase in the intensity of the signals within the audio input.

6. The method of claim 1, wherein the wherein the causing the particular type of modification to the visual element based on the characteristics of the signals in the audio input further comprises moving the visual element based on the change in the pitch of the signals in the audio input by:
moving the visual element upwards based on an increase in the pitch of the signals within the audio input; or
moving the visual element downwards based on a decrease in the pitch of the signals within the audio input.

7. The method of claim 1, further comprising:
receiving video input captured by the camera during creation of the video item;
determining, based on the video input, characteristics of the video input in real time, wherein the characteristics of the video input change over time; and
causing a modification to audio output associated with the video item in response to determining a change in the characteristics of the video input.

8. The method of claim 7, wherein determining the change in the characteristics of the video input comprises detecting a movement of at least one object in the video input.

9. The method of claim 7 wherein the causing the modification to the audio output associated with the video item comprises modifying at least one of pitch, tone, volume, energy, echo, or duration associated with the audio output.

10. A system comprising:
one or more computer processors; and
one or more computer memories comprising computer-readable instructions that upon execution by the one or more computer processors, configure the system to perform operations comprising:
receiving audio input via a first component of a computing device during creation of a video item, wherein the audio input corresponds to an audio element associated with the video item;
determining, based on the audio input, characteristics of signals in the audio input in real time, wherein the characteristics change over time in the audio input;
determining a particular type of change in the characteristics of the signals in the audio input;
determining at least one modification based on the particular type of the change in the characteristics of the signals, wherein the at least one modification instruction indicates a particular type of modification to be made to a visual element captured by a camera associated with the video item; and
causing the particular type of modification to the visual element captured by the camera associated with the video item based on the characteristics of the signals in the audio input, wherein the causing the particular type of modification to the visual element based on the characteristics of the signals in the audio input comprises:
inserting at least one animated graphical element over the visual element to replace or obscure at least a portion of the visual element based on a change in intensity of the signals in the audio input.

11. The system of claim 10, wherein the receiving the audio input via the first component of the computing device comprises receiving the audio input via a microphone.

12. The system of claim 11, wherein the characteristics comprise a sound feature, and wherein the sound feature comprises at least one of pitch, tone, volume, energy, or duration.

13. The system of claim 10, wherein the causing the particular type of modification to the visual element based on the characteristics of the signals in the audio input further comprises moving the visual element based on the change in pitch of the signals in the audio input by shaking the visual element based on an increase in the pitch of the signals in the audio input.

14. The system of claim 10, wherein the inserting at least one animated graphical element over the visual element based on a change in the intensity of the signals in the audio input comprises inserting the at least one animated graphical element over the visual element based on an increase in the intensity of the signals within the audio input.

15. The system of claim 10, wherein the causing the particular type of modification to the visual element based on the characteristics of the signals in the audio input further comprises moving the visual element based on the change in the pitch of the signals in the audio input by:
moving the visual element upwards based on an increase in the pitch of the signals within the audio input; or
moving the visual element downwards based on a decrease in the pitch of the signals within the audio input.

16. A non-transitory computer-readable storage medium, storing computer-readable instructions that upon execution by a processor cause the processor to implement operations comprising:
receiving audio input via a first component of a computing device during creation of a video item, wherein the audio input corresponds to an audio element associated with the video item;
determining, based on the audio input, characteristics of signals in the audio input in real time, wherein the characteristics change over time in the audio input;
determining a particular type of change in the characteristics of the signals in the audio input;
determining at least one modification instruction based on the particular type of the change in the characteristics of the signals, wherein the at least one modification instruction indicates a particular type of modification to be made to a visual element captured by a camera associated with the video item; and causing the particular type of modification to the visual element captured by the camera associated with the video item based on the characteristics of the signals in the audio input, wherein the causing the particular type of modification to the visual element based on the characteristics of the signals in the audio input comprises:

inserting at least one animated graphical element over the visual element to replace or obscure at least a portion of the visual element based on a change in intensity of the signals in the audio input.

17. The non-transitory computer-readable storage medium of claim 16, wherein the receiving the audio input via the first component of the computing device comprises receiving audio input via a microphone.

18. The non-transitory computer-readable storage medium of claim 16, wherein the causing the particular type of modification to the visual element based on the characteristics of the signals in the audio input further comprises moving the visual element based on the change in pitch of the signals in the audio input by shaking the visual element based on an increase in the pitch of the signals in the audio input.

19. The non-transitory computer-readable storage medium of claim 16, wherein the inserting at least one animated graphical element over the visual element based on a change in the intensity of the signals in the audio input comprises inserting the at least one animated graphical element over the visual element based on an increase in the intensity of the signals within the audio input.

20. The non-transitory computer-readable storage medium of claim 16, wherein the causing the particular type of modification to the visual element based on the characteristics of the signals in the audio input further comprises moving the visual element based on the change in the pitch of the signals in the audio input by:

moving the visual element upwards based on an increase in the pitch of the signals within the audio input; or moving the visual element downwards based on a decrease in the pitch of the signals within the audio input.

\* \* \* \* \*